(12) United States Patent
Dutta

(10) Patent No.: US 12,021,734 B2
(45) Date of Patent: Jun. 25, 2024

(54) NETWORK-TOPOLOGY DISCOVERY USING PACKET HEADERS

(71) Applicant: Nokia Solutions and Networks OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/331,827

(22) Filed: May 27, 2021

(65) Prior Publication Data

US 2022/0385560 A1   Dec. 1, 2022

(51) Int. Cl.
    *H04L 45/021*   (2022.01)
    *H04L 45/00*    (2022.01)
    *H04L 45/16*    (2022.01)
    *H04L 69/22*    (2022.01)

(52) U.S. Cl.
    CPC .......... *H04L 45/021* (2013.01); *H04L 45/16* (2013.01); *H04L 45/26* (2013.01); *H04L 69/22* (2013.01)

(58) Field of Classification Search
    None
    See application file for complete search history.

(56) References Cited

U.S. PATENT DOCUMENTS

| | | | | |
|---|---|---|---|---|
| 2002/0159437 A1* | 10/2002 | Foster | ............... | H04L 49/552 |
| | | | | 370/396 |
| 2015/0103691 A1* | 4/2015 | Bhattacharya | ...... | H04L 41/0803 |
| | | | | 370/254 |
| 2015/0131660 A1* | 5/2015 | Shepherd | ............... | H04L 45/74 |
| | | | | 370/390 |
| 2018/0013630 A1* | 1/2018 | Tatlicioglu | ............ | H04L 45/64 |

(Continued)

OTHER PUBLICATIONS

WO 2021/021172 A1 (Year: 2021).*

(Continued)

*Primary Examiner* — June Sison
(74) *Attorney, Agent, or Firm* — Mendelsohn Dunleavy, P.C.; Steve Mendelsohn

(57) ABSTRACT

Automated topology-discovery processes, wherein topology-related information is exchanged among the nodes of a network using data-plane headers of transmitted packets, and without relying on conventional control-plane topology-discovery protocols. For such "control-plane-less" topology discovery, a discovery-enabling Topology Discovery Header (TDH) may be encoded as an extension of the data-plane header. Such TDH can be used, e.g., to carry various types of pertinent information typically relied-upon by the relevant network entities for topology-discovery purposes. In some embodiments, topology discovery is fully migrated from the control plane to the data plane and is substantially integrated into the corresponding Packet Switching Technology. Due to this migration, some features of some conventional control protocols may not be critically needed in (Continued)

the corresponding communication networks. As a result, adaptation, streamlining, replacement, and/or elimination of some of such control protocols may beneficially be implemented, e.g., to meet the needs of the network operator in a cost-effective manner.

29 Claims, 24 Drawing Sheets

(56) References Cited

U.S. PATENT DOCUMENTS

2020/0067792 A1* 2/2020 Aktas ............... H04L 41/5009
2021/0352011 A1* 11/2021 Boutros ............... H04L 45/44

OTHER PUBLICATIONS

RFC 793 Transmission Control Protocol (TCP) (Sep. 1981) to Darpa. ("Darpa") (Year: 1981).*
U.S. Appl. No. 17/135,448; titled "Load Balancing in Packet Switched Networks", filed Dec. 28, 2020 (106 pages).
Breitbart, Yuri, et al. "Topology Discovery in Heterogeneous IP Networks." Proceedings IEEE Infocom 2000. Conference on Computer Communications. Nineteenth Annual Joint Conference of the IEEE Computer and Communications Societies (Cat. No. 00CH37064). vol. 1 (2000): 265-274.
Donnet, Benoit, et al. "Improved Algorithms for Network Topology Discovery." Preprint, Passive and Active Network Measurement. PAM 2005. Lecture Notes in Computer Science, vol. 3431. Springer, Berlin, Heidelberg. (2005): 14 pages.
Lowekamp, Bruce, et al. "Topology Discovery for Large Ethernet Networks." ACM SIGCOMM Computer Communication Review 31.4 (2001): 237-248.
Ochoa-Aday, Leonardo, et al. "Discovering the Network Topology: An Efficient Approach for SDN." Advances in Distributed Computing and Artificial Intelligence Journal 5.2 (2016): 101-108.
"IEEE Standard for Local and metropolitan area networks—Media Access Control (MAC) Bridges and Virtual Bridged Local Area Networks—Amendment 20: Shortest Path Bridging." IEEE 802.1aq-2012, doi: 10.1109/IEEESTD.2012.6231597. (Jun. 2012): 340 pages.
"IEEE 802 Numbers", www.iana.com, retrieved on Aug. 27, 2021, Retrieved from Internet: <URL: https://www.iana.org/assignments/ieee-802-numbers/ieee-802-numbers.xhtml> (15 pages).
Postel, J., "Internet Protocol", STD 5, RFC 791, DOI 10.17487/RFC0791, <https://www.rfc-editor.org/info/rfc791> (Sep. 1981): 49 pages.
Callon, R., "Use of OSI ISIS for Routing in TCP/IP and Dual Environments", RFC 1195, DOI 10.17487/RFC1195, <https://www.rfc-editor.org/info/rfc1195> (Dec. 1990): 68 pages.
Moy, J., "OSPF Version 2", STD 54, RFC 2328, DOI 10.17487/RFC2328, <https://www.rfc-editor.org/info/rfc2328> (Apr. 1998): 244 pages.
Deering, S. et al., "Internet Protocol, Version 6 (IPv6) Specification", RFC 2460, DOI 10.17487/RFC2460, <https://www.rfc-editor.org/info/rfc2460> (Dec. 1998): 39 pages.
Andersson, L., et al., "LDP Specification", RFC 5036, DOI 10.17487/RFC5036, <https://www.rfc-editor.org/info/fc5036> (Oct. 2007): 135 pages.
Coltun, R.,et al. "OSPF for IPV6", RFC 5340, DOI 10.17487/RFC5340, <https://www.rfc-editor.org/info/rfc5340> (Jul. 2008): 94 pages.
Fedyk, D., et al. "IS-IS Extensions Supporting IEEE 802.1aq Shortest Path Bridging", RFC 6329, DOI 10.17487/RFC6329, <https://www.rfc-editor.org/info/rfc6329> (Apr. 2012): 37 pages.
Filsfils, C., et al. "Segment Routing Architecture", RFC 8402, DOI 10.17487/RFC8402, <https://www.rfc-editor.org/info/rfc8402> (Jul. 2018): 32 pages.

* cited by examiner

100

| ROUTING TABLE ||
| DESTINATION | NEXT-HOP |
| --- | --- |
| A | LOCAL |
| B | A → B |
| C | A → B |
| D | A → B |
| E | A → B |
| F | A → B |
| G | A → B |
| H | A → B |

| 1202 — TYPE | LENGTH | — 1204 |
|---|---|---|
| 1206 — | NODE ID | |
| 1208 — | CHECKSUM | |
| 1210 — | TYPE SPECIFIC DATA | |

FIG. 13
820

| 1202 — TYPE (1) | LENGTH | — 1204 |
|---|---|---|
| 1206 — | NODE ID | |
| 1208 — | CHECKSUM | |
| 1312 — | ND INTERVAL | ⎫ |
| 1314 — | NodePriority (OPTIONAL) | ⎪ |
| 1316 — | NodeDeadInterval | ⎬ 1210 |
| 1318 — | DESIGNATED NODE (OPTIONAL) | ⎪ |
| 1320 — | BACKUP DESIGNATED NODE (OPTIONAL) | ⎪ |
| 1322 — | NEIGHBOR | ⎭ |

| 1502 | 1504 | 1506 |
|---|---|---|
| LSA AGE | RESERVED | LSA TYPE (1) |
| LINK STATE ID ||| (1508)
| ADVERTISING NODE ID ||| (1510)
| NEIGHBOR NODE ID ||| (1512)
| LS SEQUENCE NUMBER ||| (1514)
| LENGTH | COST || (1516) — 1602

FIG. 17
1700

| 1502 | 1504 | 1506 |
|---|---|---|
| LSA AGE | RESERVED | LSA TYPE (2) |
| LINK STATE ID ||| (1508)
| ADVERTISING NODE ID ||| (1510)
| NEIGHBOR NODE ID ||| (1512)
| LS SEQUENCE NUMBER ||| (1514)
| LENGTH ||| (1516)
| NETWORK MASK (OPTIONAL) ||| (1702)
| ATTACHED NODE ||| (1704)

1500

1800

820

820

2100

2300

2400

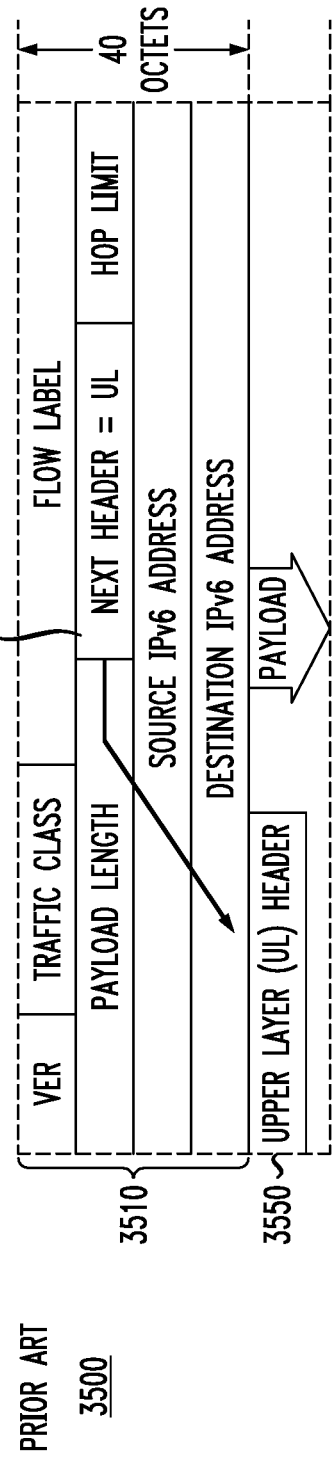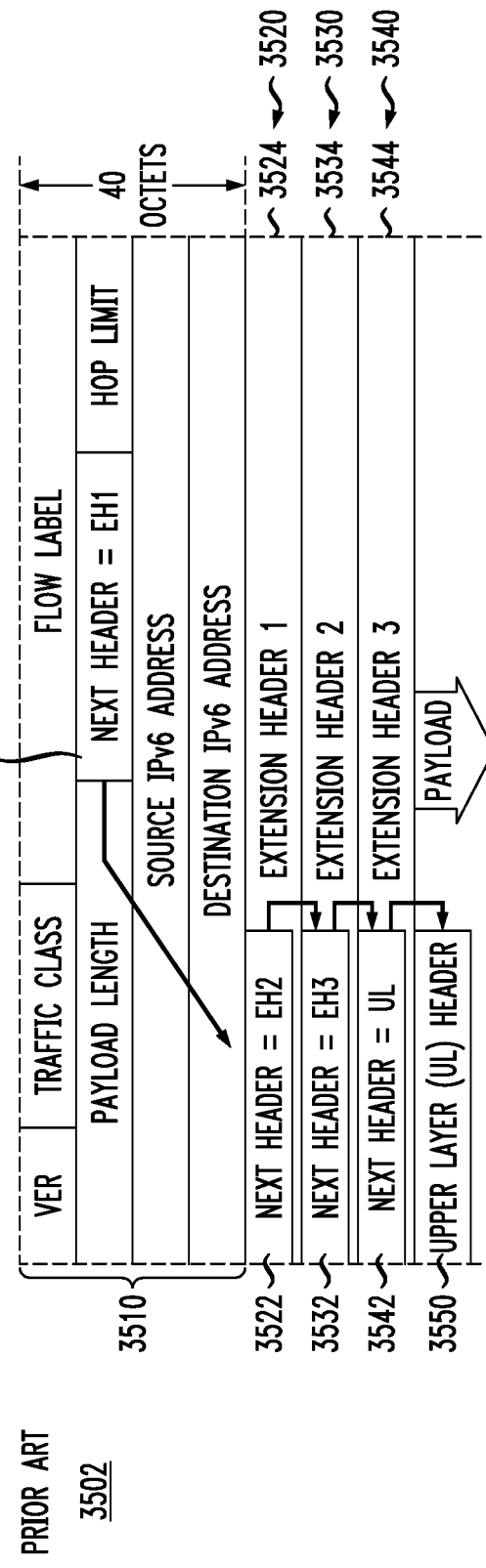
FIG. 35A PRIOR ART 3500
FIG. 35B PRIOR ART 3502

3600

3700

NETWORK-TOPOLOGY DISCOVERY USING PACKET HEADERS

BACKGROUND

Field

Various example embodiments relate to communication equipment and, more specifically but not exclusively, to automated network-topology-discovery processes.

Description of the Related Art

This section introduces aspects that may help facilitate a better understanding of the disclosure. Accordingly, the statements of this section are to be read in this light and are not to be understood as admissions about what is in the prior art or what is not in the prior art.

Network topology is the arrangement of various elements, such as links, nodes, routers, switches, etc., of a communication network. Two basic categories of network topologies are physical topology and logical topology. Physical topology refers to the placement of various network components, e.g., device locations and cable installations, whereas logical topology describes how data may flow within the network. Maintaining accurate network-topology databases is a critical task for enabling many vital network functions, such as data routing, network management, quality of service (QoS), and so on. Modern communication networks typically rely on automated topology-discovery processes for compiling and maintaining such databases.

SUMMARY OF SOME SPECIFIC EMBODIMENTS

Disclosed herein are various embodiments of automated topology-discovery processes, wherein topology-related information can be exchanged among the nodes of a network using data-plane headers of transmitted packets, and without relying on conventional control-plane topology-discovery protocols. For such "control-plane-less" topology discovery, a discovery-enabling Topology Discovery Header (TDH) may be encoded as an extension of the data-plane header. Such TDH can be used, e.g., to carry various types of pertinent information typically relied-upon by the relevant network entities for topology-discovery purposes, thereby substantially eliminating the need for transmitting similar information in control-protocol packets. Different embodiments may be suitable, e.g., for various IP and Ethernet networks.

In some embodiments, topology discovery is fully migrated from the control plane to the data plane and is substantially integrated into the corresponding Packet Switching Technology. Due to this migration, some features of some conventional control protocols may not be critically needed in the corresponding communication networks. As a result, adaptation, streamlining, replacement, and/or elimination of some of such control protocols may beneficially be implemented, e.g., to meet the needs of the network operator in a cost-effective manner.

According to an example embodiment, provided is an apparatus, comprising a network device that comprises: at least one processor; and at least one memory including program code; and wherein the at least one memory and the program code are configured to, with the at least one processor, cause the network device at least to: encode a data-plane header of a first data packet, the data-plane header including a topology-discovery header having information for automated discovery of topology of a network; and send the first data packet through one or more links of the network in accordance with the data-plane header.

According to another example embodiment, provided is an apparatus, comprising a network device that comprises: at least one processor; and at least one memory including program code; and wherein the at least one memory and the program code are configured to, with the at least one processor, cause the network device at least to: read a data-plane header of a first data packet received from a network, the data-plane header including a topology-discovery header having information for automated discovery of topology of the network; and use the information to build or update at least one of: a routing information base of the network device; a topology database of the network device; and a forwarding information base of the network device.

According to yet another example embodiment, provided is a non-transitory machine-readable medium, having encoded thereon program code, wherein, when the program code is executed by a machine, the machine implements a method comprising the steps of: (A) encoding a data-plane header of a data packet, the data-plane header including a topology-discovery header having information for automated discovery of topology of a network; and (B) sending the data packet through one or more links of the network in accordance with the data-plane header.

According to yet another example embodiment, provided is a non-transitory machine-readable medium, having encoded thereon program code, wherein, when the program code is executed by a machine, the machine implements a method comprising the steps of: (A) reading a data-plane header of a data packet received from a network, the data-plane header including a topology-discovery header having information for automated discovery of topology of the network; and (B) using the information to build or update at least one of: a routing information base of a network device; a topology database of the network device; and a forwarding information base of the network device.

BRIEF DESCRIPTION OF THE DRAWINGS

Other aspects, features, and benefits of various disclosed embodiments will become more fully apparent, by way of example, from the following detailed description and the accompanying drawings, in which:

FIG. 12 shows a block diagram of a Topology Discovery Header (TDH) according to an embodiment;

FIG. 13 shows a block diagram of the TDH of FIG. 12 corresponding to a first type of topology-discovery information according to an embodiment;

FIG. 16 shows a block diagram of an LSA corresponding to a first LSA type, which can be used in the TDH of FIG. 14 according to an embodiment;

FIG. 17 shows a block diagram of an LSA corresponding to a second LSA type, which can be used in the TDH of FIG. 14 according to an embodiment;

FIGS. 35A-35B schematically illustrate insertion of extension headers into an IPv6 data packet;

DETAILED DESCRIPTION

The following acronyms/abbreviations are used in the description of various embodiments and/or in the accompanying drawings:

ACK Acknowledgement;
ASIC Application-Specific Integrated Circuit;
BGP Border Gateway Protocol;
CPU Central Processing Unit;
CR Constraint-based Routing;
CRC Cyclic Redundancy Check;
CSPF Constraint Shortest Path First;
DA Destination Address;
DC Data Center;
ECMP Equal Cost Multiple Paths;
EH Extension Header;
FCS Frame Check Sequence;
FIB Forwarding Information Base;
ID Identifier;
IEEE Institute of Electrical and Electronics Engineers;
IGP Interior Gateway Protocol;
IHL Internet Header Length;
IP Internet Protocol;
IPv4 Internet Protocol version 4;
IPv6 Internet Protocol version 6;
I/O Input/Output;
IS-IS Intermediate System to Intermediate System;
LAN Local Area Network;
LDP Label Distribution Protocol;

LS Link State;
LSA Link State Advertisement;
LSDB Link State Database;
LSP Labeled Switched Path;
MAC Media Access Control;
MPLS Multiprotocol Label Switching;
NBMA Non-Broadcast Multiple Access;
ND Neighbor Discovery;
OSI Open Systems Interconnection;
OSPF Open Shortest Path First;
PCE Path Computation Server/Element;
PMP Point to Multi-Point;
PST Packet Switching Technology;
QoS Quality of Service;
RFC Request for Comments;
RIB Routing Information Base;
RIP Routing Information Protocol;
RSVP Resource Reservation Protocol;
SA Source Address;
SFD Start Frame Delimiter;
SID Segment Identifier;
SPB Shortest Path Bridging;
SPT Shortest Path Tree;
SR Segment Routing;
TDH Topology Discovery Header;
TDO Topology Discovery Option;
TCP Transmission Control Protocol;
TE Traffic Engineering;
TEDB Traffic Engineering Database;
TE-LSP Traffic Engineered Labeled Switched Path;
TLV Type, Length, Value;
TPID Tag Protocol Identifier;
UCMP Unequal Cost Multi-Path;
UI User Interface;
UL Upper Layer;
VLAN Virtual LAN.

Figure 1:
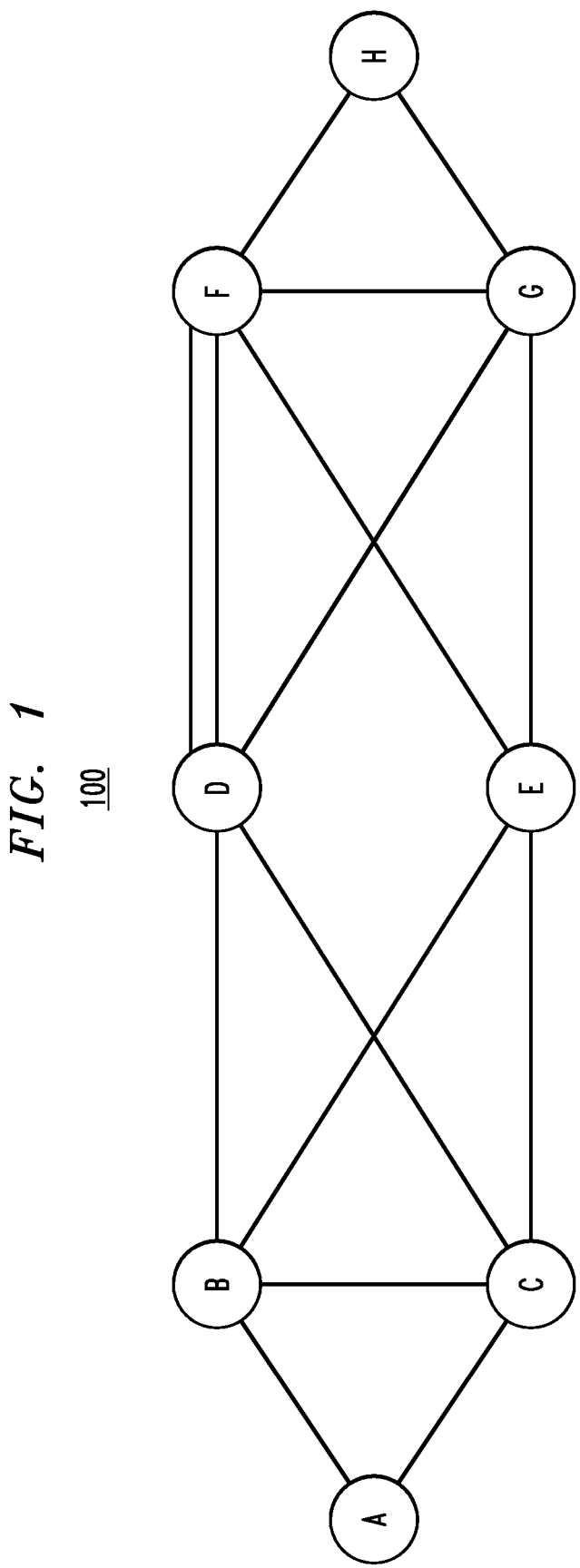
FIG. 1 shows a block diagram of a communication network in which various disclosed embodiments can be practiced.

FIG. 1 shows a block diagram of a communication network 100 in which various disclosed embodiments can be practiced. Network 100 is illustratively shown as comprising eight nodes, labeled A-H. In operation, the nodes A-H can appropriately send and receive data packets, via the corresponding links, from a corresponding source node to a corresponding destination node. In an example embodiment, each of the nodes A-H can operate as an ingress node, as a relay node, and/or as an egress node.

Communication network 100 has a partial mesh topology, in which each of the nodes A-H is directly connected to only some of the other nodes. However, various embodiments disclosed herein are not limited only to partial mesh topologies. For example, at least some embodiments can be adapted for a communication network having a full mesh topology, in which each of the nodes A-H is directly connected to each of the other nodes. In various alternative embodiments, communication network 100 can have more or fewer than eight constituent nodes connected to one another using the corresponding full mesh topology or any desired partial mesh topology.

When functioning as an ingress node, a node X (where X=A, B, . . . , H) may operate to: (i) receive data from an external source via a corresponding peripheral link (not explicitly shown in FIG. 1); (ii) (re)packetize the received data; (iii) modulate a carrier using the packetized data; and (iv) apply the resulting modulated signal to appropriate one or more of the corresponding links. When functioning as an egress node, a node X may operate to: (i) receive a modulated signal from a corresponding link; (ii) extract the payload data therefrom; and (iii) direct the extracted data to an external destination via a corresponding peripheral link (not explicitly shown in FIG. 1). When functioning as a relay node, a node X may operate to receive a data packet via one link and then send the corresponding data packet through one or more other links.

The following convention may be used in a functional description of communication network 100.

The identifier/address of a node X is denoted as X. For example, in an IP network 100, node H may be uniquely identified with its loop-back IP address, which is denoted as H here. A link from a node X to a node Y (where Y=A, B, . . . , H and Y≠X) is denoted as X-Y, with the nodes being listed in the alphabetical order. For example, a link between node A and node C is denoted as A-C, not C-A, regardless of directionality. If node X has multiple links to node Y, then a first of such links is denoted as X1-Y1, a second of such links is denoted as X2-Y2, and so on. For example, in FIG. 1, nodes D and F have two corresponding connecting links. As such, link-1 from node D to node F is denoted as D1-F1, and link-2 is denoted as D2-F2. In the link X-Y, the identifier/address assigned to the link by node Y is denoted as X→Y, and the identifier/address assigned to the link by node X is denoted as Y→X. For example, in an IP network 100, B→D is the IP address assigned by node D on its end of the B-D link, and D→B is the IP address assigned by node B on its end of B-D link.

Network 100 may be configured to support one or more of the following paradigms for routing packets: (1) Shortest Path Routing; (2) Unequal Cost Multi-Path (UCMP); and (3) Explicit Path Routing. Explicit Path Routing may be implemented using the stateful-explicit-path approach or the stateless-explicit-path approach. These routing paradigms are described in more detail below in reference to FIGS. 2-5.

Figures 2, 3:
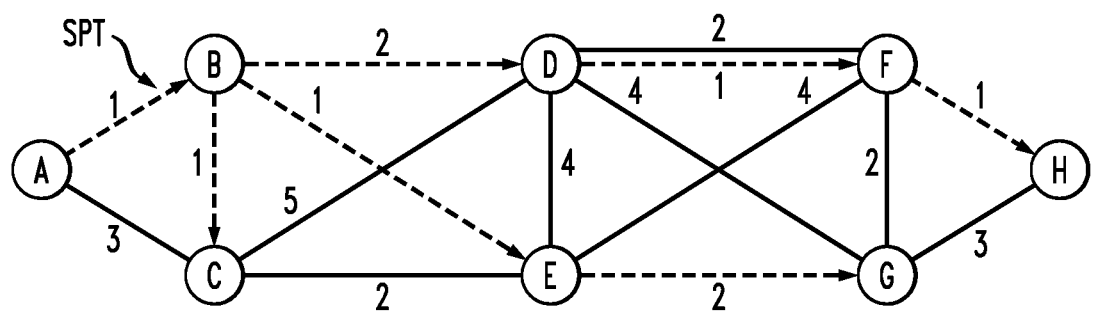
FIGS. 2-3 illustrate a Shortest Path Routing paradigm that can be supported in some embodiments of the communication network shown in FIG. 1.

FIGS. 2-3 illustrate a Shortest Path Routing paradigm that can be supported in some embodiments of network 100. More specifically, FIG. 2 pictorially shows an example Shortest Path Tree (SPT) for node A of network 100. FIG. 3 shows the corresponding example routing table for node A of network 100.

Under the Shortest Path Routing paradigm, every node X of network 100 originates the status of its adjacent links and networks as Link State Advertisements (LSAs). Typically, an LSA carries identification of a link/network, cost of the link/network, etc. For illustration purposes, FIG. 2 indicates example link costs as the corresponding integer values shown next to the links. For example, the link A-B has a cost of 1 a.u.; the link B-C has a cost of 1 a.u.; the link B-D has a cost of 2 a.u., and so on. Herein, "a.u." denotes arbitrary units suitable for quantifying the cost.

The LSAs can be flooded across network 100 by way of Interior Gateway Protocols (IGPs) running among the nodes. As a result, each node X can build an identical topology database (e.g., a database of LSAs) of network 100. Node X can then compute paths to destinations by applying a Shortest Path Tree (SPT) algorithm to the topology stored in the topology database. An example SPT algorithm that can be used for this purpose is the so-called Djkstra's algorithm. The SPT algorithm causes a packet to be directed to a destination along the shortest path, i.e., the path to the destination through network 100 characterized by the lowest total cost. The dashed arrows in FIG. 2 show the corresponding SPT, which comprises a plurality of such shortest paths.

For some network topologies, there can be multiple equal-cost shortest paths to a destination. In such cases, the packet flows to the destination can be load-balanced across all equal-cost multiple paths (ECMP).

Based on the SPT, each node X can build a corresponding routing table, an example of which is shown in FIG. 3 for X=A. In case of IP networks, the destination entries in the routing table are IP prefixes, e.g., the IP addresses of the corresponding nodes.

Suppose node A of network 100 needs to send a packet to node H. To perform this task, node A accesses its routing table, e.g., a table similar to the table of FIG. 3, to look up therein an entry for destination H and finds the next hop to be A→B. Based on this entry, node A sends the packet on the A-B link. Upon receiving the packet, node B accesses its routing table to look up therein an entry for destination H and finds the next hop to be B→D, as evident from the SPT shown in FIG. 2. Upon receiving the packet, node D accesses its routing table to look up therein an entry for destination H and finds the next hop to be D1→F1, as evident from the SPT shown in FIG. 2. Upon receiving the packet, node F accesses its routing table to look up therein an entry for destination H and finds the next hop to be F→H, as evident from the SPT shown in FIG. 2. Upon receiving the packet, node H accesses its routing table to look up therein an entry for destination H and finds the next hop to be "Local," meaning that the packet has reached its destination.

In MPLS networks, the shortest-path Labeled Switched Paths (LSPs) to destinations are set-up using the Label Distribution Protocol (LDP) or Segment Routing (SR), which are similarly based on the shortest-path IP routes computed using the IGPs.

In SPB-based Ethernet networks, the shortest paths to various destination bridges are computed using the Intermediate System to Intermediate System (IS-IS) protocol. Ethernet packets from a source bridge to a destination bridge are sent along the shortest path to the destination bridge.

Figure 4:
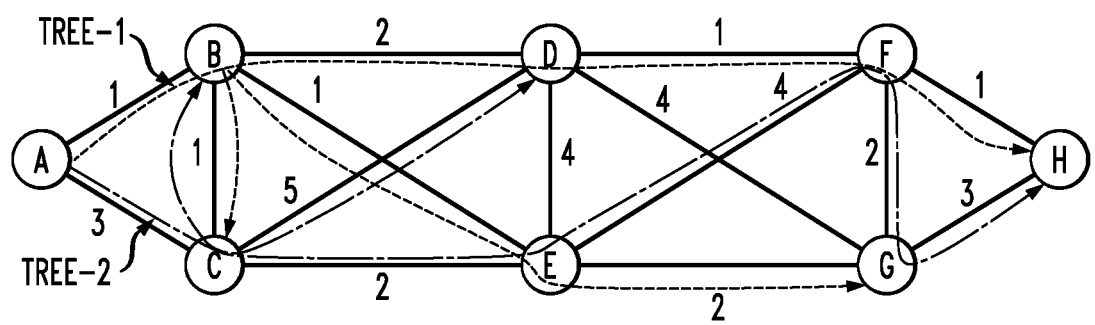
FIG. 4 illustrates an Unequal Cost Multi-Path routing paradigm that can be supported in some embodiments of the communication network shown in FIG. 1.

FIG. 4 illustrates a UCMP paradigm that can be supported in some embodiments of network 100. More specifically, an example of UCMP routing for node A is pictorially shown in FIG. 4. Under UCMP routing, packets to a destination are sprayed fairly (e.g., approximately evenly) across all possible paths to the destination in network 100 irrespective of the flows associated with the packets. This type of routing may provide nearly optimal utilization of certain network resources in some cases, e.g., by eliminating or reducing congestion to nearly maximize the throughput of packets. To enable UCMP routing, node X may compute as many maximally disjoint trees as possible to various destinations in network 100. Herein, the term "maximally disjoint trees" means that the respective links included in different one of such trees are substantially mutually exclusive. After the maximally disjoint trees are determined, packets to a destination can be load-balanced across the paths to the destination corresponding to different ones of such trees, e.g., in a round robin fashion. Note that, under UCMP routing, the costs of the load-balanced paths to the destination are not equal. Various embodiments of UCMP routing can be employed, e.g., in IP, MPLS, and Ethernet networks.

In the example shown in FIG. 4, node A has two paths to each of nodes B-H, each path via a corresponding one of two maximally disjoint trees, labeled Tree-1 and Tree-2, respectively. For example, node A has the following paths to node H: (i) in Tree-1, the path A→B→D→F→H of cost 5 a.u.; and (ii) in Tree-2, the path A→C→E→F→G→H of cost 14 a.u. Node A can load-balance the transmitted packets evenly over Tree-1 and Tree-2, e.g., in a round-robin manner.

In operation, each node X may independently compute the respective maximally disjoint trees to nodes Y of network 100. The computed trees do not need to be mutually correlated among the nodes. When a node needs to send a packet along a path of a tree, the node may encode an ordered list of links or nodes of the path into the packet's header. Each transit node along the path then uses the topmost entry in the list and forwards the packet to its next hop identified by the topmost entry. As such, UCMP routing does not rely on destination-based routing.

Figure 5:
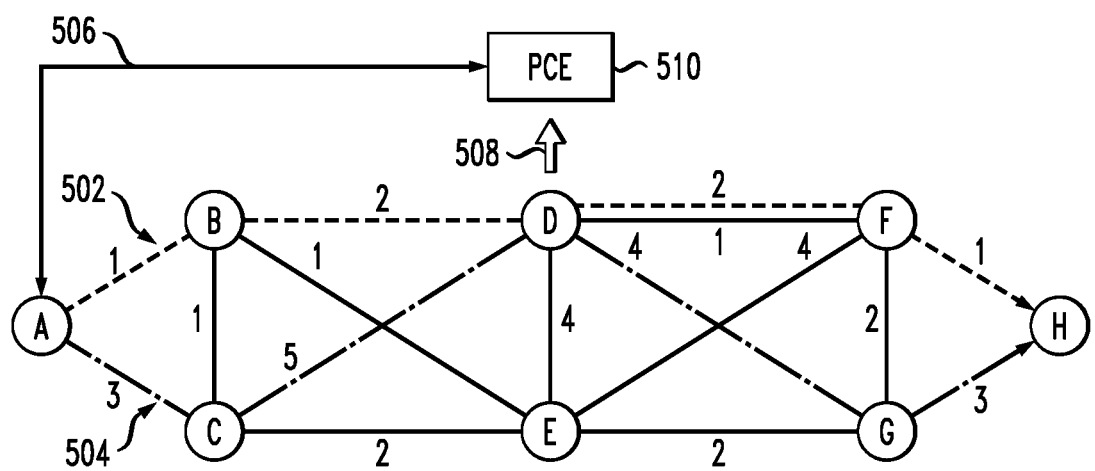
FIG. 5 illustrates an Explicit Path Routing paradigm that can be supported in some embodiments of the communication network shown in FIG. 1.

FIG. 5 illustrates an Explicit Path Routing paradigm that can be supported in some embodiments of network 100. More specifically, an example of Explicit Path Routing for node A is pictorially shown in FIG. 5. Under Explicit Path Routing, node X originates Traffic Engineering (TE) LSAs (TE-LSAs) for each of its adjacent links. A TE-LSA may include certain parameters of the corresponding link, such as the configured bandwidth, available bandwidth, delay, color, etc., which can be used to make traffic-engineering decisions. The TE-LSAs originated by node X can be flooded across network 100, e.g., by way of the IGPs running among the nodes. As a result, each node of network 100 can build an identical Traffic Engineering Database (TEDB) of the network.

In operation, node X may sort the packets that are ingressing into network 100 into packet flows, with the sorting being based on certain fields in the packet headers or other selected characteristics of the packets. For each packet flow, a corresponding explicit path comprising a set of nodes and/or links is set up from the source node to the destination node such that the path meets QoS requirements of the flow. Then, packets belonging to a flow are sent along the explicit path set-up in this manner for that flow. The explicit path can be computed, e.g., by executing a Constraint Shortest Path First (CSPF) algorithm on the TEDB. Once an explicit path is set-up, the dynamic TE parameters of the links along the path can be updated, e.g., to reflect the actual resources reserved for the path. For example, available bandwidth on a link is typically reduced by the amount of bandwidth consumed by the path. This change in turn triggers an updated TE-LSA for the link, which is then flooded throughout network 100.

Depending on the specific embodiment, an explicit path may be computed by the corresponding ingress node or by a centralized Path Computation Server/Element (PCE) 510. In operation, PCE server 510 may receive copies 508 of the flooded TE-LSAs and build a TEDB of network 100. One benefit of such PCE-based computation may be that the inter-IGP area Traffic Engineered Labeled Switched Paths (TE-LSPs) can be used as well, because PCE server 510 can be configured to receive TE-LSAs from all IGP areas of network 100.

As already indicated above, the explicit paths may be stateful or stateless. Explicit Path Routing differs from Shortest Path Routing (FIGS. 2-3) in that there can potentially be any number of explicit paths between a source node and a destination node under Explicit Path Routing.

Under the stateful explicit-path approach, a suitable control-plane signaling protocol may be used to set up states for the flow in the nodes along the explicit path. For example, an MPLS-based explicit path (which is sometimes referred to as the TE-LSP) can be set-up using suitable signaling protocols, such as the Resource Reservation Protocol-Traffic Engineering (RSVP-TE), Constraint-based Routing (CR) Label Distribution Protocol (LDP), etc.

To illustrate an example of the stateful explicit-path approach, FIG. 5 shows two MPLS LSPs from node A to node H, with the labels 502 and 504 representing LSP-1 and LSP-2, respectively. Depending on the embodiment, the LSPs 502 and 504 can be computed either by node A or by PCE server 510, e.g., in response to an appropriate request from node A. LSP 502 follows the explicit path of links {A→B, B→D, D→F, F→H}; and LSP 504 follows the explicit path of links {A→C, C→D, D→G, G→H}. Every node along a path maintains states for the LSP, both in the control plane (e.g., RSVP-TE, CR-LDP) and in the MPLS data plane.

In operation, every node allocates a label for the LSP from its local label space and distributes the allocated label to its upstream node. For example, suppose that node D allocates label LD-1 for LSP 502 and distributes said label upstream to node B. Then, in the MPLS data plane, node D cross-connects the incoming label LD-1 to the corresponding outgoing label LF-1 (distributed to node D by node F for LSP 502) on the D1→F1 link. Other pairs of nodes can cross-connect the corresponding incoming and outgoing labels in a similar manner. Further suppose that node A applies a packet to LSP 502. This action then triggers the following sequence of events: Node A pushes label LB-1 onto the packet and sends the MPLS packet on the A→B link. Node B replaces the label LB-1 by the label LD-1 and sends the MPLS packet on the B→D link. Node D replaces the label LD-1 by the label LF-1 and sends the MPLS packet on the D1→F1 link. Node F replaces the label LF-1 by the label LH-1 and sends the MPLS packet on F→H link. Node H then pops the latter label because node H identifies itself as the egress node for LSP 502.

A stateless explicit path may also be referred to as a source-routed path. Under the stateless explicit-path model, the nodes along the explicit path do not typically maintain states of the explicit path. Rather, the source node encodes the set of nodes/links of the explicit path onto the packet itself. Each node along the path then looks up the topmost entry in such set, pops said entry, and forwards the packet to the next-hop link represented by the entry. In this manner, the packet is sequentially directed along the links of the explicit path encoded in the packet. The computation of the explicit path in this case is preferably performed at PCE server 510. This preference is due to the fact that the paths are stateless in transit nodes, which makes it difficult for the transit nodes to account for the TE resources reserved by the paths traversing the nodes. However, the PCE server 510 is much more favorably situated to track various paths in network 100 as well as the dynamic TE resources of the links.

To illustrate an example of the stateless explicit-path approach, FIG. 5 shows two explicit paths Path-1 and Path-2 to node H from node A, with the labels 502 and 504 representing Path-1 and Path-2, respectively. As already indicated above, the explicit paths 502 and 504 can be obtained by node A from PCE server 510, e.g., through a control link 506. To send a packet along path 502, node A encodes the source route {B→D, D1→F1, F→H} onto the packet. Note that the first link A→B may not need to be encoded therein because this link is the immediate next-hop for the packet from node A. Thus, node A may simply send the packet on the A→B link. Upon receiving the packet, node B pops up the topmost entry B→D in the source route and identifies it as the B→D link. Accordingly, node B forwards the packet on the B→D link with the updated source route {D1→F1, F→H}. Upon receiving the packet, node D pops up the topmost entry D1→F1 in the source route and identifies it as the D1→F1 link. Accordingly, node D forwards the packet on the D1→F1 link with the updated source route {F→H}. Upon receiving the packet, node F pops up the topmost entry F→H in the source route and identifies it as the F→H link. Accordingly, node F forwards the packet to its destination on the F→H link.

In MPLS, Segment Routing (SR) provides a suitable architecture for sending MPLS packets along a stateless explicit path. The IPv4 and IPv6 specifications also have source-routing support, which can be used to implement the above-described stateless explicit-path approach.

At least some embodiments disclosed herein may benefit from the use of certain features disclosed in the following documents: (1) LDP Specification, RFC 5036; (2) OSPF Version 2, RFC 2328; (3) OSPF for IPv6, RFC 5340; (4) Use of OSI IS-IS for Routing in TCP/IP and Dual Environments, RFC 1195; (5) Segment Routing Architecture, RFC 8402; (6) IEEE 802.1aq—Shortest Path Bridging; (7) IS-IS Extensions Supporting IEEE 802.1aq Shortest Path Bridging, RFC 6329; (8) Internet Protocol Specification, RFC 791; (9) Internet Protocol, Version 6 (IPv6) Specification, RFC 2460; (10) IEEE 802 Numbers Registry in IANA; and (11) U.S. patent application Ser. No. 17/135,448, filed on Dec. 28, 2020, and entitled "LOAD BALANCING IN PACKET SWITCHED NETWORKS," all of which are incorporated herein by reference in their entirety.

In certain communication networks, not all of the above-indicated routing features and corresponding control protocols may be needed. For example, some data-center (DC) networks can be configured to operate using exclusively Shortest Path Routing (see, e.g., FIGS. 2-3) of IP packets between a selected set of servers. Consequently, some features of the IGPs may not be critically needed in such networks. For example, some DC networks may not be sufficiently large to have to rely on the "multiple IGP areas" feature, thereby not requiring the corresponding multi-area capability or route summarization. Some DC networks may be configured to operate as private networks, thereby not requiring some security features of some of the above-mentioned control protocols. As such, adaptation, streamlining, replacement, and/or elimination of some control protocols may advantageously be used, e.g., to reduce the cost of deployment and/or operation of such networks.

At least some embodiments disclosed herein can be used to address at least some of the above-indicated problems in the state of the art by applying the concept of "control-plane-less networking" to automated network-topology-discovery processes in some networks, e.g., in DC networks implemented using Shortest Path Routing, Explicit Path Routing, Traffic Engineering, and the like. For example, in some embodiments, the use of some IGPs can beneficially be eliminated from the traffic engineering implemented therein.

An example embodiment beneficially enables "control-plane-less" topology discovery, wherein topology-related information, such as LSAs and TE-LSAs, can be exchanged among the nodes of a network using the data-plane headers alone. For such topology discovery, a discovery-enabling Topology Discovery Header (TDH) can be encoded, e.g., as an extension header of the data-plane header. Such TDH can be used, e.g., to carry various types of pertinent information typically relied-upon by the relevant network entities for topology-discovery purposes, thereby eliminating the need for transmitting similar information in control-protocol packets. Different embodiments may be suitable, e.g., for DC networks and/or various IP and Ethernet networks.

A typical data packet is a formatted unit of data that comprises control information and payload data. The payload data typically form the part of the data packet that is and/or carries the intended message to the corresponding (e.g., remote) data receiver. The control information is sent together with the corresponding payload data to enable proper delivery thereof by the corresponding data-transport system, such as network 100. Control information is typically found in packet headers and/or trailers, whereas payload data are typically found in the packet portion(s) located between the headers and trailers. In an example implementation, control information may include source and destination addresses, error detection codes (such as checksums), sequencing information, etc. Example data packets may be IPv6 packets, MPLS packets, and/or other packets encapsulated in Ethernet frames, Wi-Fi frames, Point-to-Point Protocol frames, Fiber Channel frames, modem frames, etc.

IP routing and MPLS have distinct respective packet-forwarding mechanisms. More specifically, IP routing relies on IP addresses found in packet headers to make packet-forwarding decisions. In contrast, MPLS makes packet-forwarding decisions based on short path identifiers referred-to as "labels," which are attached to packets. SR is yet another packet-forwarding mechanism. For example, packet-forwarding decisions in SR can be based on instructions (referred-to by segment IDs or SIDs) inserted into packets. As already indicated above, SR can be implemented both over IP routing and over MPLS routing.

For illustration purposes and without any implied limitations, some example embodiments are described herein below primarily in reference to IP routing. From the provided description, a person of ordinary skill in the pertinent art will be able to make and use alternative embodiments, e.g., corresponding to MPLS or other suitable types of routing, without any undue experimentation.

In an example embodiment, IP routing may generally rely on IP forwarding tables, which are generated at the respective network nodes using routing information collected through "in-band" mechanisms, such as that enabled by the above-mentioned Topology Discovery Header (TDH). In contrast, conventional topology-discovery methods typically rely on one or more suitable control protocols, such as the IGP, Border Gateway Protocol (BGP), etc. In an example implementation, an IP forwarding table maps destination addresses to the corresponding next hops that packets are expected to take to reach their intended destinations (also see FIG. 3). When a node receives a packet, the node may access the relevant forwarding table using the destination address found in the packet's IP header and find therein a corresponding egress interface (e.g., I/O port) for the next hop. The node may then forward the packet through the egress interface. The next node that receives the packet may perform its own forwarding-table lookup, e.g., using the same destination IP address, and so on.

A useful feature provided by IPv6 is the capability to define extension headers. Extension headers are optional headers that may be used to carry additional information in a packet header. Extension headers may be placed in the packet between the fixed IPv6 header and an upper-layer protocol header, e.g., a TCP header. For example, the TDH can be implemented as an extension header to an IPv6 header (also see FIGS. 35-36). Functionally similar TDH extension headers can be constructed for other packet formats as well, e.g. as explained in more detail below.

Figure 6:
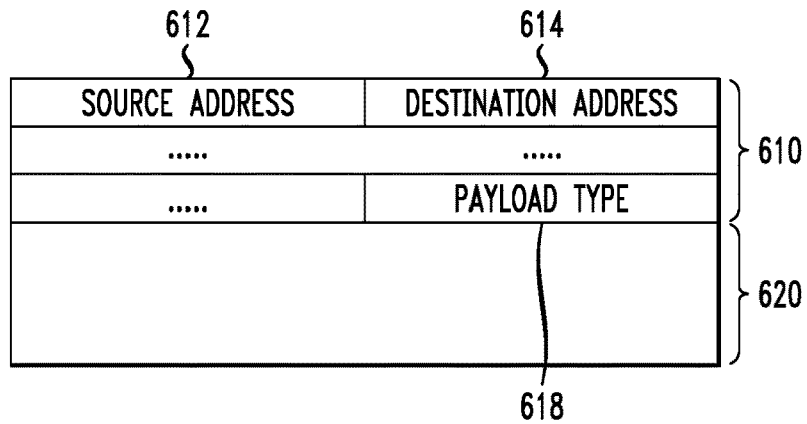
FIG. 6 shows a simplified block diagram of a data packet that may be transmitted in the communication network shown in FIG. 1.

FIG. 6 shows a simplified block diagram of a data packet 600 that may be transmitted in network 100. The shown block diagram is substantially generic and may be applicable to different packet-switching technologies (PSTs). For clarity, only some portions of data packet 600 are explicitly shown in FIG. 6, and some other portions of data packet 600 are not explicitly shown in FIG. 6, but would be known to persons of ordinary skill in the pertinent art.

Data packet 600 comprises a data-plane header 610 and a payload 620. In an IP network, the data-plane header 610 is an IP (e.g., IPv6) Header (also see FIGS. 33-36). In an Ethernet network, the data-plane header 610 is an Ethernet Header (also see FIGS. 37-39). Data-plane header 610 includes, among other fields, a source-address (SA) field 612, a destination-address (DA) field 614, and a payload-type field 618. The fields 612 and 614 identify the source and destination nodes, respectively, e.g., nodes A and H in the routing examples illustrated by FIGS. 2, 4, and 5. Payload 620 holds the actual "message" to the destination node. For example, payload 620 may comprise application/user data, which may contain, inter alia, one or more upper-layer protocol packets. The payload-type field 618 identifies the type of the payload 620 and can be used, e.g., to specify which protocol packets (if any) are included therein. In some cases, the value of "None" in the field 618 may be used to indicate the absence of payload 620 in the corresponding packet.

Figure 7:
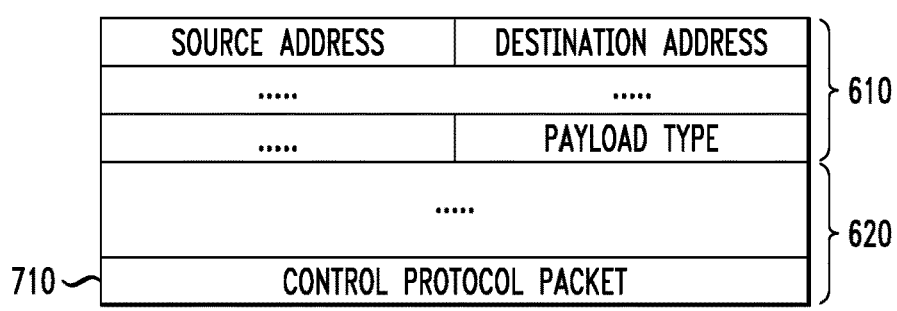
FIG. 7 shows a simplified block diagram of another data packet that may be transmitted in the communication network shown in FIG. 1.

FIG. 7 shows a simplified block diagram of a data packet 700 that may be transmitted in network 100. Data packet 700 similarly comprises data-plane header 610 and payload 620. Payload 620 comprises a control-protocol packet 710. Non-limiting examples of control-protocol packet 710 are OSPF, IS-IS, and BGP packets. For example, in case of a BGP packet 710, the data-plane header 610 is an IP header. The payload-type field 618 carries the value of "TCP." Payload 620 also includes the corresponding TCP header (not explicitly shown in FIG. 7), which is followed by the BGP packet 710.

Figure 8:
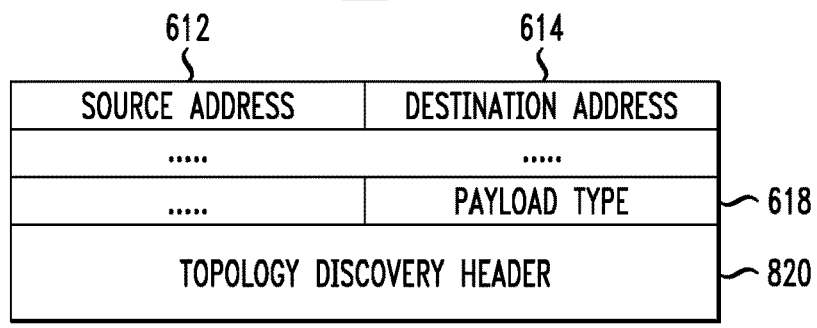
FIG. 8 shows a simplified block diagram of a data-plane header that may be used in some data packets transmitted in the communication network shown in FIG. 1 according to an embodiment.

FIG. 8 shows a simplified block diagram of a data-plane header 810 that may be used in some data packets transmitted in network 100 according to an embodiment. Data-plane header 810 includes, among other fields, the above-described SA field 612, DA field 614, and payload-type field 618. Data-plane header 810 further includes a TDH 820. In an example embodiment, TDH 820 can be an extension header to the above-described header 610. In an alternative embodiment, a different sequence of fields in the data-plane header 810 can be realized, wherein the payload-type field 618 may be located after the TDH 820 in such sequence, i.e., closer to the end of such sequence than the TDH.

In some packet-switching technologies, an extension header may be classified as a part of the payload. In such cases, the payload-type field 618 may be used to ensure proper processing of the TDH 820 by various nodes. For example, the payload-type field 618 may carry the code value of "TDH" in cases where the extension headers are considered to be parts of the payload. On the other hand, the payload-type field 618 may carry the value of "None" in cases where the extension headers are not considered to be parts of the payload and other payload types are not present in the packet. In the latter cases, the data-plane header 810 by itself can be transmitted as a data-plane packet.

In an example embodiment, the following example types of information can be carried within TDH 820:

Type 1: Neighbor Discovery, e.g., used to discover neighboring nodes over a link;

Type 2: LSA Bundle, e.g., used to encode LSAs or TE-LSAs;

Type 3: LSA Acknowledgement (ACK)/ACK Bundle, e.g., used to acknowledge receipt of an LSA or a TE-LSA from a neighbor;

Type 4: LSA Request Bundle, e.g., used by a node to request an LSA or a TE-LSA from a neighbor.

For example, Type 3 can be used to ensure reliable "in-band" exchange of LSAs and/or TE-LSAs between a pair of nodes of network 100.

In conventional networks, automated network-topology-discovery processes typically rely on control-protocol packets, such as packet 710 (FIG. 7), to deliver the information needed to build a network-topology database. A control-plane packet (for topology discovery), such as packet 710, typically belongs to a layer or sub-layer located higher in the OSI-layer stack than the layer corresponding to the employed packet-switching technology (PST). Such control-plane (sub)layer can, for example, be located in the OSI-layer stack directly next to the PST layer or two or more levels above the PST layer. Herein, the term "data-plane header" refers to a header used by the employed PST for forwarding packets. As already indicated above, the payload, such as payload 620, of a data packet may include one or more upper-layer packets, stacked in the appropriate order. A control-plane packet for topology discovery, such as packet 710, can typically be the uppermost packet within the payload stack.

A control-plane packet, such as packet 710, is typically opaque to the transit nodes, e.g., to the forwarding nodes of the PST located in the path between source and destination nodes. That is, a transit node forwards the data packet based on the data-plane header alone, without inspecting the corresponding payload. The payload is typically inspected (e.g., unwrapped, read, and processed) only when the destination-address field 614 is a local address to the node. Hence, each node of the network typically requires an appropriately addressed data packet to be able to extract topology-related information, such as LSAs and TE-LSAs, from control-protocol packet(s) 710.

Herein, the terms "control plane" and "data plane" generally refer to conceptual models used to describe how a network device (e.g., a router, switch, or node) handles the data. The control plane is generally considered to be the functional part wherein the network device makes its decisions. This functional part is mostly software-based and typically uses a central processing unit (CPU), rather than specialized hardware, such as an application-specific integrated circuit (ASIC). Accordingly, the control plane "engages" a relatively slow packet-processing path. In contrast, the data plane (also sometimes referred to as the "forwarding plane") provides a high-speed/high-throughput path through the network device. To achieve the high speed and throughput, data-plane implementations mostly rely on specialized hardware, e.g., ASICs. Also, only a portion of the data packet, i.e., typically certain parts of the data-plane header, may be read, processed, and/or changed to issue the corresponding instructions, whereas the payload is not unwrapped during the data-plane processing and is passed on as a whole unit or container, i.e., remaining opaque to the data plane.

In example embodiments of automated network-topology-discovery processes disclosed herein, topology discovery is migrated from the control plane to the data plane and is substantially integrated into the PST itself. For example, if the PST is IP, then the TDH 820 can be a part of the IP Header or its extensions. If the PST is Ethernet, then the TDH 820 can be a part of the Ethernet Header or its extensions. Due to this migration, some features of some above-mentioned control protocols may not be critically needed in at least some embodiments of network 100. As a result, adaptation, streamlining, replacement, and/or elimination of some control protocols may beneficially be implemented, e.g., to meet the needs of the network operator in a cost-effective manner.

Figure 9:
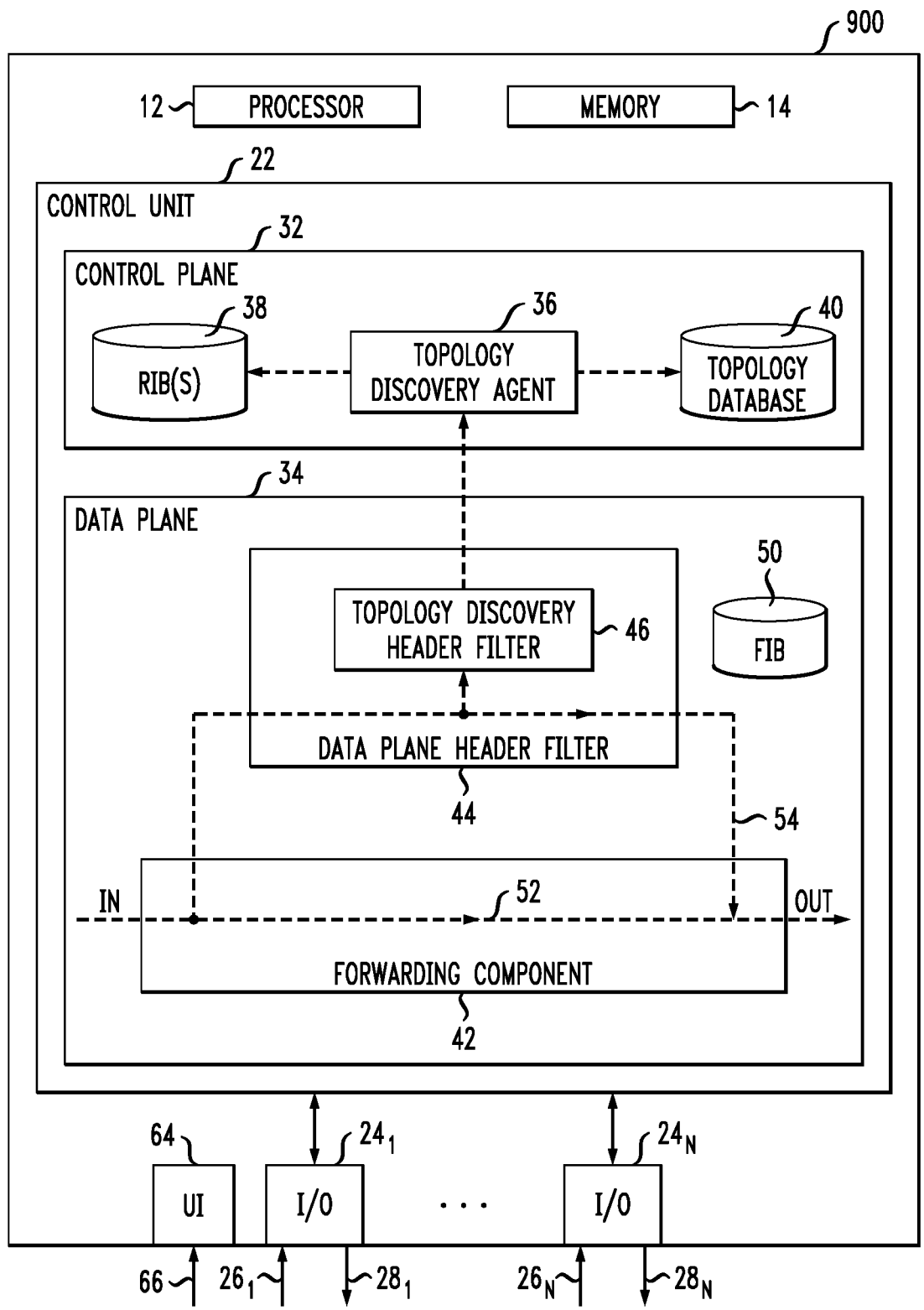
FIG. 9 shows a block diagram of a network device using which at least some embodiments may be practiced.

FIG. 9 shows a block diagram of a network device 900 using which at least some embodiments may be practiced. As shown, network device 900 comprises a processor 12, a memory 14, a control unit 22, input/output (I/O) ports $24_1$-$24_N$, and an optional user interface (UI) 64, where N is an integer greater than one. Processor 12 may be configured to carry out data/signal processing and/or execute instructions to support proper operation of other components of network device 900. Memory 14 may be configured to store therein the program code and configuration data needed for proper support and execution of various functions of network device 900.

In an example embodiment, network device 900 may include a chassis or cabinet (not explicitly shown in FIG. 9) having a plurality of slots configured to house certain components of the network device, e.g., implemented in the form of insertable blades or cards, including, for example, the I/O ports $24_1$-$24_N$. The chassis typically provides communicable coupling of the inserted blades and/or cards to control unit 22 via a bus, a backplane, and/or other suitable communication mechanism. In operation, the I/O ports $24_1$-$24_N$ may receive packets and/or other network traffic via ingress network links $26_1$-$26_N$, respectively, and may send packets and/or other network traffic via egress network links $28_1$-$28_N$, respectively. In some embodiments, a pair of links $26_n$ and $28_n$ (where n=1, N) may be implemented using a common physical communication medium capable of supporting a full duplex mode of operation. In some embodiments, each of the I/O ports $24_1$-$24_N$ may be capable of sending and receiving data signals at the same time.

In an example embodiment, control unit 22 may be partitioned into logical and/or physical planes, each implementing a respective distinct functionality. As illustratively shown in FIG. 9, control unit 22 comprises a control plane 32 and a data or forwarding plane 34. Control unit 22 may further comprise a service plane (not explicitly shown in FIG. 9) and possibly some other logical or physical planes. In some embodiments, some or all of such planes may be implemented using different respective software pieces running on a shared set of hardware components, e.g., including processor 12 and memory 14. In some other embodiments, some or all of such planes may be implemented using different respective hardware components (e.g., digital circuits). In yet some other embodiments, some or all of such planes may be implemented using some suitable combinations of dynamically programmable and one-time programmable (e.g., static) digital circuits.

In an example embodiment, control plane 32 operates to provide a routing functionality for network device 900. For example, control plane 32 may be configured to implement one or more routing protocols, which can be called upon as appropriate or necessary. Such routing protocols may include, for example, some of the above-mentioned protocols (see, e.g., FIGS. 2-5), the Routing Information Protocol (RIP), the BGP protocol, and/or other suitable routing protocols. Control plane 32 also typically has one or more routing information bases (RIBs) 38 and a topology database 40 configured to store relevant routing and topology information therein. In operation, at least some of such routing and topology information can be loaded into RIB(s) 38 and topology database 40 by a topology-discovery agent 36, e.g., based on the pertinent TDH information received from data plane 34 as indicated in FIG. 9. Control plane 32 may use the information stored in the RIB(s) 38 and topology database

40 to select or determine one or more routes through network 100 for packets that are being processed by network device 900.

Control plane 32 may further operate to update a forwarding information base (FIB) 50 of data plane 34 in accordance with the pertinent routing protocol(s) and information stored in the RIB(s) 38 and topology database 40. When forwarding a packet, data plane 34 may generally rely on the packet's header and information from the FIB 50 to determine a next hop for the packet (also see the example shown in FIG. 3). Data plane 34 may then identify a subset of egress network links 28$_1$-28$_N$ that the packet may be applied to.

In an example embodiment, data plane 34 comprises a forwarding component 42 and a data-plane-header filter 44. Forwarding component 42 can be implemented, e.g., using a packet processor, a packet-forwarding engine, or other suitable execution unit that operates to execute actions on the received packets. Data-plane-header filter 44 operates to determine which action(s) is/are to be applied to a packet based on its data-plane header (e.g., 610, 810) and optionally by accessing a corresponding flow cache (not explicitly shown in FIG. 9) and, if necessary, memory 14. A dashed arrow 54 schematically indicates a processing path invoked by data plane 34 in the process of determining a set of actions applicable to a packet 52 temporarily stored in forwarding component 42.

In operation, network device 900 may receive packet 52 through one of ingress network links 28$_1$-28$_N$. Forwarding component 42 typically has a buffer in which packet 52 can be temporarily stored. Actions that the forwarding component 42 may apply to the stored packet 52 can be selected, e.g., from the following nonexclusive list: (i) forward packet 52 to one or more I/O ports 24 for transmission on the corresponding one or more links 28; (ii) drop packet 52; (iii) add a tag to packet 52; (iv) send packet 52 to another module within network device 900, e.g., to the connection tracker module, etc.

In an example embodiment, data-plane-header filter 44 comprises a TDH filter 46 coupled to processing path 54, e.g., as indicated in FIG. 9. TDH filter 46 operates to detect TDHs 820 of the packets 52 and extract information from the detected TDHs. The extracted information can then be directed to the topology-discovery agent 36 of control plane 32 for being used therein to build and/or update the RIB(s) 38 and topology database 40. More specifically, the topology-discovery agent 36 may processes the received information and update topology database 40. Topology-discovery agent 36 may also compute a RIB 38 based on the updated topology database 40. Control plane 32 may then program the entries of the RIB(s) 38 into the FIB 50 of data plane 34.

In some embodiments, network device 900 may receive configuration information 66 through UI 64, e.g., from a system administrator. UI 64 can be implemented, e.g., as a command line interface.

Figure 10:
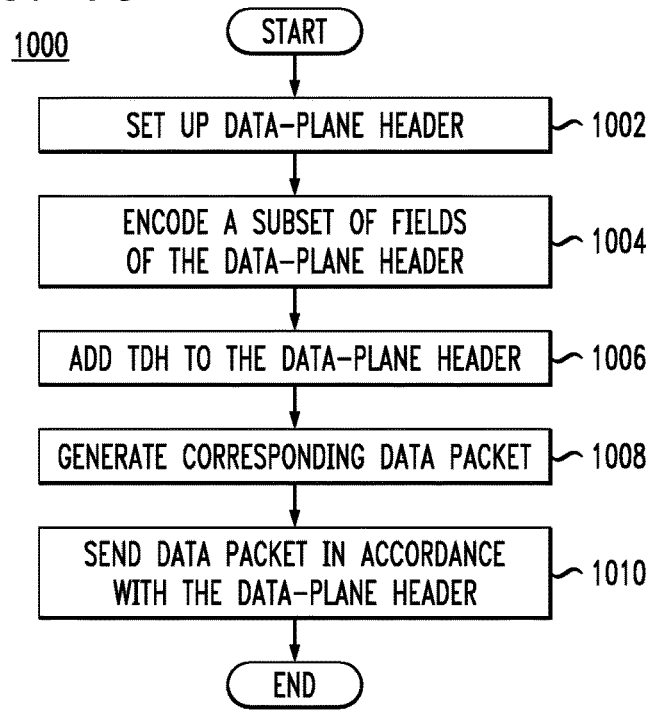
FIG. 10 shows a flowchart of a packet-processing method that can be implemented using the network device of FIG. 9 according to an embodiment.

FIG. 10 shows a flowchart of a packet-processing method 1000 that can be implemented using network device 900 according to an embodiment. In an example embodiment, method 1000 can be executed by network device 900 to send a packet having a TDH 820 in a data-plane header thereof.

Method 1000 begins at step 1002, whereat network device 900 operates to set up a data-plane header corresponding to the PST employed in the corresponding network 100. In an example embodiment, step 1002 may comprise the sub-steps of selecting and fetching an appropriate template of a data-plane header, e.g., from memory 14.

At step 1004, network device 900 operates to fill a relevant subset of fields of the header template set-up at step 1002. For example, step 1004 may include the sub-steps of: (i) encoding a local identifier (address) of the corresponding link into the SA field 612; (ii) encoding a target address into the DA field 614; (iii) encoding other pertinent fields of the template as appropriate or necessary.

At step 1006, network device 900 operates to add (e.g., insert or append) a TDH 820 to the template processed at step 1004, thereby generating a data-plane header 810 (FIG. 8). As already indicated above, in an example embodiment, TDH 820 may be, e.g., an extension header to the data-plane header generated at step 1004. Example formats and contents of the added TDH 810 are described in more detail below in reference to FIGS. 12-20.

At step 1008, network device 900 operates to generate a data packet having the data-plane header 810. Depending on the packet type and the absence or presence of the payload, the payload-type field 618 may also be appropriately encoded at step 1008.

At step 1010, network device 900 operates to send the data packet generated at step 1008 by appropriately applying said packet to one or more corresponding network links 28$_1$-28$_N$ based on the encoding performed at step 1004 and the corresponding routing table, e.g. stored in the FIB 50. The processing of method 1000 is then terminated.

Figure 11:
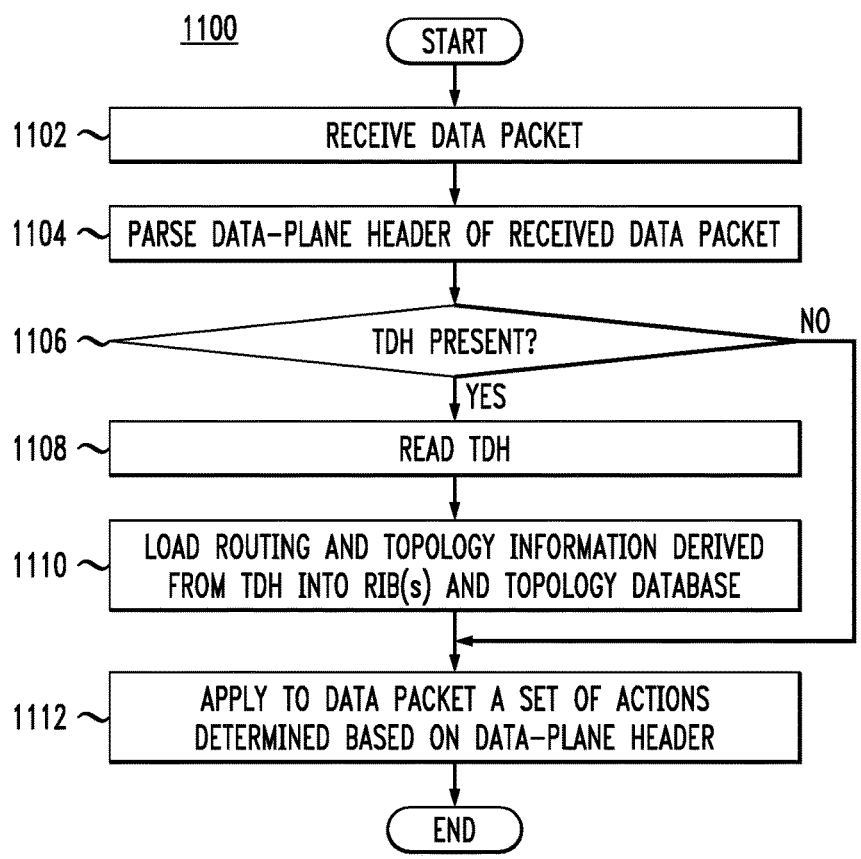
FIG. 11 shows a flowchart of another packet-processing method that can be implemented using the network device of FIG. 9 according to an embodiment.

FIG. 11 shows a flowchart of a packet-processing method 1100 that can be implemented using network device 900 according to an embodiment. In an example embodiment, method 1100 can be executed by network device 900 to extract routing and topology information from a received data packet having a TDH 820 in a data-plane header 810 thereof.

Method 1100 begins at step 1102, whereat network device 900 stores a received data packet in a buffer of the forwarding component 42.

At step 1104, the data-plane-header filter 44 of network device 900 operates to parse the data-plane header (e.g., 610, 810) of the data packet received at step 1102. The parsing enables the data-plane-header filter 44 to read (e.g., at step 1112) the information encoded in various fields (e.g., 612, 614, etc.) of the data-plane header. The read information can be used, e.g., to appropriately configure forwarding component 42 for further acting on the packet, e.g., at step 1112. The parsing further enables the data-plane-header filter 44 to determine whether or not a TDH 820 is present.

Step 1106 serves to select different processing sequences for data packets having TDH 820 and for data packets not having a TDH. If TDH 820 is detected, then the processing of method 1100 is directed to step 1108. Otherwise, the processing of method 1100 is directed to step 1112.

At step 1108, TDH filter 46 operates to read the information encoded in TDH 820 of the buffered data packet and direct the read-out results to topology-discovery agent 36 for further processing thereat.

At step 1110, topology-discovery agent 36 operates to process one or more read-outs received from TDH filter 46 to obtain or derive therefrom the corresponding routing and topology information. Topology-discovery agent 36 then operates to load the routing and topology information into RIB(s) 38 and topology database 40.

At step 1112, the data-plane-header filter 44 operates to read the information encoded in various pertinent (non-TDH) fields (e.g., 612, 614, etc.) of the data-plane header of the buffered data packet. Based on the read-out results, the data-plane-header filter 44 determines a set of actions that are to be applied to the buffered data packet and configures the forwarding component 42 to carry out those actions. The processing of method 1000 is then terminated.

FIG. 12 shows a block diagram of TDH 820 according to an embodiment. As shown, TDH 820 comprises fields 1202-1208 and a multi-field portion 1210.

The field 1202 indicates the type of information encoded in TDH 820. Several example types of such information (i.e., Type 1, Type 2, Type 3, and Type 4), which can be encoded in TDH 820, have already been mentioned above in reference to FIG. 8. Additional and/or alternative types of information may similarly be defined for alternative embodiments of TDH 820.

The field 1204 indicates the length of TDH 820, e.g., in units of octets.

The field 1206 provides an identifier of the node at which TDH 820 was originated, e.g., using method 1000 (FIG. 10). The identifier is encoded in the field 1206 in accordance with the addressing scheme of the utilized PST.

The field 1208 provides a conventional checksum of the contents of TDH 820, which enables various nodes of network 100 to validate the integrity of the TDH. In an example embodiment, the checksum 1208 can be calculated, e.g., as the 16-bit one's complement of the one's complement sum of all 16-bit words in the TDH. If the TDH's length is not an integer number of 16-bit words, then the TDH can be padded, e.g., with a byte of zeros, to produce an effective length that is an integer number of 16-bit words.

The structure of multi-field portion 1210 depends on the type indicated in the field 1202. Several example structures of multi-field portion 1210 are described below in reference to FIGS. 13-20.

FIG. 13 shows a block diagram of TDH 820 corresponding to a first type (Type 1) of topology-discovery information according to an embodiment. The fields 1202-1208 of this TDH are the same as in FIG. 12. The field 1202 indicates "Type 1." The multi-field portion 1210 comprises fields 1312-1322.

As already indicated above, Type 1 represents Neighbor Discovery (ND). Neighbor Discovery may be used to discover neighbors over a link and maintain connections with such neighbors. Neighbor Discovery also ensures that communications between the connected neighbors are bidirectional. TDH 820 (Type 1) packets can be sent periodically or occasionally through different links. Bidirectional communication is indicated when a node sees itself listed in the neighbor's TDH 820 (Type 1) packet(s). In broadcast networks and Non-Broadcast Multi-Access (NBMA) networks, Neighbor Discovery can be used to elect a Designated Node for the network.

Neighbor Discovery may work differently in broadcast networks, NBMA networks, and Point-to-Multipoint (PMP) networks.

For example, in broadcast networks, each node can advertise itself by periodically or non-periodically multicasting TDH 820 (Type 1) packets. These advertisements enable neighbors to be discovered dynamically. TDH 820 (Type 1) packets may contain the node's view of the Designated Node's identity and a list of nodes whose TDH 820 (Type 1) packets have been seen recently.

In NBMA networks, some specific configuration information may be needed for properly running the corresponding ND Protocol. For example, each node that may potentially become a Designated Node typically has a list of all other nodes attached to the network. A node having a Designated Node potential may send "Hello Packets" to all other potential Designated Nodes when its interface to the NBMA network first becomes operational. This feature helps to find the Designated Node(s) for the network. If a node itself is elected to be a Designated Node, then the node begins sending TDH 820 (Type 1) packets to all other nodes attached to the network.

After a neighbor is discovered, bidirectional communication is ensured, and (if in a broadcast or NBMA network) a Designated Node is elected, a decision can be made regarding whether or not an adjacency should be formed with the neighbor. If an adjacency is to be formed, then an initial step of the corresponding process is to synchronize the neighbors' link-state databases. This synchronization is described in more detail below in reference to FIG. 14.

The TDH 820 shown in FIG. 13, i.e., Type 1, enables the above-outlined Neighbor Discovery. More specifically, when TDH 820 has "Type 1" encoded in the field 1202 thereof, the SA field 612 of the corresponding data-plane header 810 encodes the sender node's address on the link on which the corresponding data packet is being sent. An adjacency with a neighbor over a link can then be identified by the tuple {SA ID, Neighbor Node ID}. The Neighbor Node ID can be obtained from the Node ID of the TDH 820 (Type 1) packets received from such neighbor over the corresponding link.

The field 1312 (ND Interval) indicates the number of seconds between the transmitting node's TDH 820 (Type 1) packets.

The field 1314 (Node Priority) is optional and may be used, e.g., in broadcast networks, NBMA networks, and PMP networks for a (Backup) Designated Node election. That is, the field 1314 may indicate the node's priority in such election. For example, if the value in the field 1314 is set to zero, the corresponding node is ineligible to become a (Backup) Designated Node.

The field 1316 (Node Dead Interval) indicates the number of seconds before a silent node is declared to be "down" (e.g., non-operational).

The field 1318 (Designated Node) is optional and may be used, e.g., in broadcast networks, NBMA networks, and PMP networks, for a Designated Node election. That is, the field 1318 may encode the identity of the Designated Node for network 100, in the view of the sending node. The Designated Node may be identified in the field 1318 by its address in network 100 in accordance with the utilized PST. If the value in the field 1318 is "zero," then there is no Designated Node.

The field 1320 (Backup Designated Node) is optional and may also be used, e.g., in broadcast networks, NBMA networks, and PMP networks, for a Designated Node election. That is, the field 1320 may encode the identity of the Backup Designated Node for network 100, in the view of the sending node. The Backup Designated Node may be identified in the field 1320 by its address in network 100 in accordance with the utilized PST. If the value in the field 1318 is "zero," then there is no Backup Designated Node.

The field 1322 (Neighbor) provides identifiers of each node from which one or more valid TDH 820 (Type 1) packets have been seen recently in network 100. Herein, "recently" means in the last "Node Dead Interval" seconds (also see the field 1316).

Figure 14:
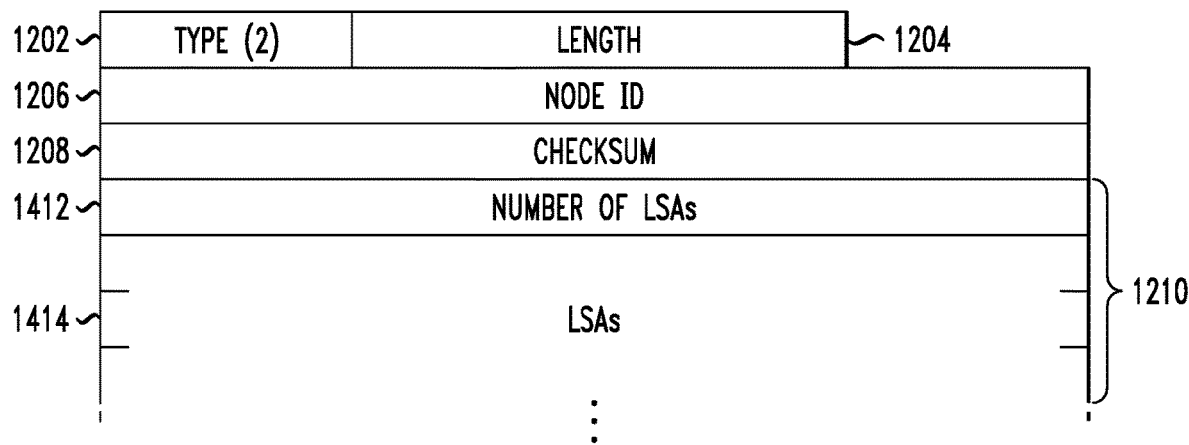
FIG. 14 shows a block diagram of the TDH of FIG. 12 corresponding to a second type of topology-discovery information according to an embodiment.

FIG. 14 shows a block diagram of TDH 820 corresponding to a second type (Type 2) of topology-discovery information according to an embodiment. The fields 1202-1208 of this TDH are the same as in FIG. 12. The field 1202 indicates "Type 2." The multi-field portion 1210 comprises a field 1412 and a multi-field portion 1414.

As already indicated above, Type 2 represents an LSA Bundle. The LSA Bundle implements a mechanism through which LSAs can be flooded in network 100. More specifically, each LSA Bundle may carry a collection of LSAs one hop further from their origin. One or more LSAs may be included in TDH 820 (Type 2).

LSA bundles can typically be multicast on physical networks that support the multicast/broadcast functionality. To make the flooding procedure more reliable, flooded LSAs may be acknowledged using Link State Acknowledgment Headers (also see FIG. 19). If retransmission of certain LSAs is needed, then the retransmitted LSA(s) may be sent directly to the respective affected neighbor(s), as opposed to being multicast.

The field 1412 (Number of LSAs) indicates the number of LSAs included in the multi-field portion 1414. Example field structures that can be used to implement the multi-field portion 1414 are described below in reference to FIGS. 15-18.

Figure 15:
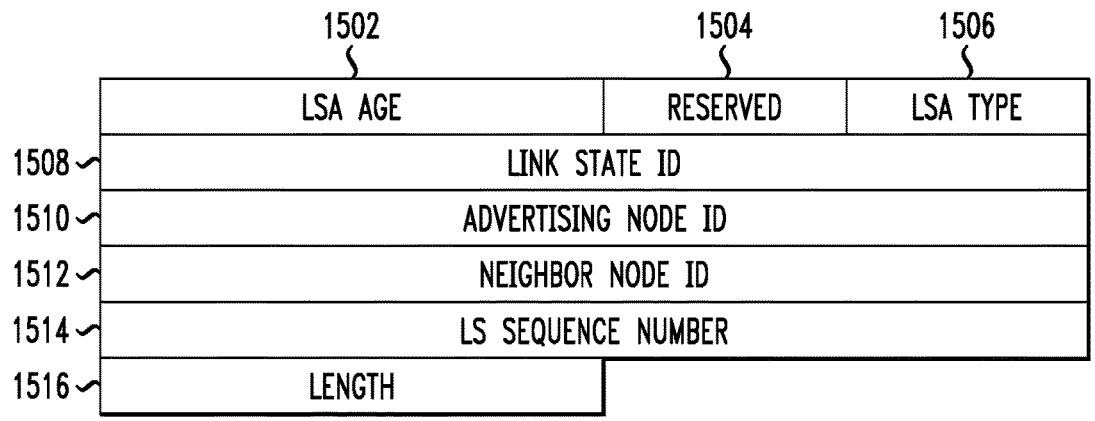
FIG. 15 shows a block diagram of a Link State Advertisement (LSA) header that can be used in the TDH of FIG. 14 according to an embodiment.

FIG. 15 shows a block diagram of an LSA header 1500, one or more instances of which may be present in the multi-field portion 1414 of TDH 820 (Type 2). More specifically, each LSA listing in the multi-field portion 1414 may include a respective LSA header 1500 and a respective LSA body (also see FIG. 18). As shown in FIG. 15, LSA header 1500 comprises fields 1502-1516.

The field 1502 (LSA Age) indicates the time (e.g., in seconds) elapsed since the respective LSA was originated. If a node does not receive a refresh for an LSA from network 100 within the "LSA Age" time indicated in the corresponding field 1502, then the node may delete such LSA from the node's Link State Database (LSDB).

The field 1504 (Reserved) is reserved for future use. Until the reserved field 1504 is allocated to a specific use in the future, the sender node is configured to write a "zero" value therein, and the receiver node is configured to disregard this field.

The field 1506 (LSA Type) indicates the type of the respective LSA. Each LSA type may use a respective distinct format. In an example embodiment, the following example LSA types may be specified in the field 1506:
  LSA Type 1: Node LSA;
  LSA Type 2: Network LSA;
  LSA Type 3: TE LSA. Example LSA formats corresponding to these LSA types are described below in reference to FIGS. 16-18.

The field 1508 (Link State ID) identifies the portion of network 100 that is being described by the LSA. The contents of this field may depend on the LSA Type indicated in the field 1506. For example, for Network LSAs (i.e., LSA Type 2) the Link State ID may be set to the link address of the network's Designated Node. For Node LSAs (i.e., LSA Type 1), the Link State ID may be set to the address of the link at the neighboring node, and so on.

The field 1510 (Advertising Node ID) contains the identifier of the node that originated the LSA. For example, for Network LSAs (i.e., LSA Type 2), the field 1510 may carry the identifier of the network's Designated Node.

The field 1512 (Neighbor Node ID) may be used to identify the neighboring node (if any) associated with the link when the respective LSA represents a link with a neighbor.

The value encoded in the field 1514 (LS Sequence Number) may be used to detect old or duplicative LSAs. More specifically, different successive instances of an LSA are typically given different successive LS sequence numbers by the advertising node, which enables a receiving node to identify out-of-sequence or duplicative LSAs in a relatively straightforward manner.

The field 1516 (Length) indicates the total length in bytes of the respective LSA. Such length includes the length of the LSA header 1500 and the length of the corresponding LSA body (also see FIGS. 16-18).

FIG. 16 shows a block diagram of an LSA 1600 corresponding to a first LSA type (i.e., LSA Type 1) according to an embodiment. One or more instances of LSA 1600 may be present in the multi-field portion 1414 of a TDH 820 (Type 2). LSA 1600 comprises LSA header 1500 (also see FIG. 15). The field 1506 therein indicates "LSA Type 1." LSA 1600 further comprises an LSA body consisting of a single field 1602 (Cost). The field 1602 encodes the cost value of the link described by the LSA. The field 1508 (Link State ID) encodes the address of the link at the neighbor, which can be learned, e.g., from the source address of a TDH 820 (Type 1) previously received from the neighbor.

FIG. 17 shows a block diagram of an LSA 1700 corresponding to a second LSA type (i.e., LSA Type 2) according to an embodiment. One or more instances of LSA 1700 may be present in the multi-field portion 1414 of a TDH 820 (Type 2). LSA 1700 comprises LSA header 1500 (also see FIG. 15). The field 1506 therein indicates "LSA Type 2." LSA 1700 further comprises an LSA body comprising fields 1702 and 1704.

As already indicated above, an LSA Type 2 represents a Network LSA. A Network LSA may be originated for each broadcast and NBMA network in an area that supports two or more nodes. Such Network LSA may be originated, e.g., by the network's Designated Node. The LSA may describe all nodes attached to the network, including the Designated Node itself. The LSA's field 1508 (Link State ID) typically encodes the address of the Designated Node. Since the distance from the network to any of the attached nodes is zero, a cost field (e.g., analogous to the field 1602, FIG. 16) may not be included in some embodiments of LSA 1700.

The field 1702 (Network Mask) may be optional, e.g., for a PST that supports grouping of node addresses in a broadcast or NBMA network by a common sub-network address prefix. When present, the field 1702 may encode the mask for the sub-network address prefix.

The field 1704 (Attached Node) provides the Node IDs of each of the nodes attached to the network. In some embodiments, only those nodes that are fully adjacent to the Designated Node may be listed in the field 1704. The Designated Node also typically includes itself in this list. The number of nodes included in the field 1704 can be deduced, e.g., from the value encoded in the field 1516 of the corresponding LSA header 1500.

Figure 18:
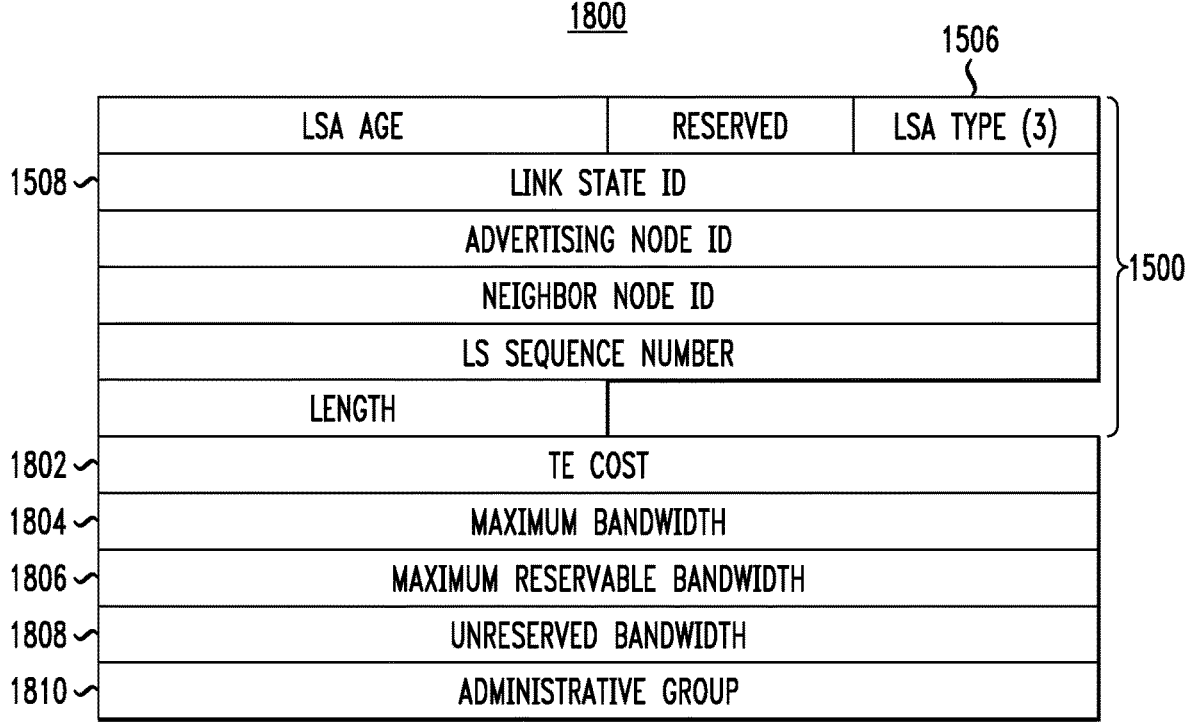
FIG. 18 shows a block diagram of an LSA corresponding to a third LSA type, which can be used in the TDH of FIG. 14 according to an embodiment.

FIG. 18 shows a block diagram of an LSA 1800 corresponding to a third LSA type (i.e., LSA Type 3) according to an embodiment. One or more instances of LSA 1800 may be present in the multi-field portion 1414 of a TDH 820 (Type 3). LSA 1800 comprises LSA header 1500 (also see FIG. 15). The field 1506 therein indicates "LSA Type 3." LSA 1800 further comprises an LSA body comprising fields 1802-1810.

As already indicated above, an LSA Type 3 represents a TE LSA. A TE LSA encodes traffic-engineering information of a link between two neighboring nodes. The field 1508 (Link State ID) in LSA 1800 encodes the address of the link at the neighbor, which can be learned, e.g., from the source address of a TDH 820 (Type 1) received from the neighbor.

The field 1802 (TE Cost) specifies the cost value of the corresponding link for traffic-engineering purposes. This cost value may be different from a conventional cost value of an LSA. For example, a network administrator may assign a TE-Cost value based on some auxiliary considerations.

The field 1804 (Maximum Bandwidth) specifies the maximum bandwidth that can be used on the corresponding link, in the corresponding direction (i.e., from the node originating the LSA to its neighbor), in the IEEE floating-point format. The value specified in the field 1804 may be interpreted as the true link capacity. Example units in which this value is specified may be bytes per second.

The field 1806 (Maximum Reservable Bandwidth) specifies the maximum bandwidth that may be reserved on the corresponding link, in the corresponding direction, in the IEEE floating-point format. In some cases, the value specified in the field 1806 may be greater than the maximum bandwidth, meaning that the link may be oversubscribed. This feature may be user-configurable. The default value for the field 1806 can be the same as that for the Maximum Bandwidth. Example units in which this value is specified may be bytes per second.

The field 1808 (Unreserved Bandwidth) specifies the amount of bandwidth not yet reserved at each of the eight priority levels used in the IEEE floating-point format. The values specified in the field 1808 correspond to the bandwidths that can be reserved with priority levels selected from the range 0 to 7, arranged in the ascending order starting with the 0-th priority level at the beginning of this sub-TLV and ending with the 7-th priority level. The initial values (before any bandwidth is reserved) may be all set to the value of Maximum Reservable Bandwidth. Each value can be smaller than or equal to the value of Maximum Reservable Bandwidth. Example units in which these values are specified may be bytes per second.

The field 1810 (Administrative Group) may contain a 4-octet bit mask assigned by the network administrator. Therein, each set bit corresponds to one administrative group assigned to the interface. A link may belong to multiple groups. By convention, the least significant bit is referred to as "group 0," and the most significant bit is referred to as "group 31." The Administrative Group may alternatively be referred to as the Resource Class.

Nodes may originate TE-LSAs whenever the TE-LSA contents change, and whenever otherwise needed (e.g., for a refresh). This feature should not be interpreted as meaning that every change is to be flooded immediately. Rather, a specific implementation of this feature may set applicable thresholds (e.g., a bandwidth-change threshold) that may trigger immediate flooding. Some other changes may warrant flooding at a later time, e.g., after an applicable time interval. In an example embodiment, the origination of TE LSAs may be rate-limited.

Upon receipt of a changed TE LSA, a node typically updates its TEDB accordingly.

Figure 19:
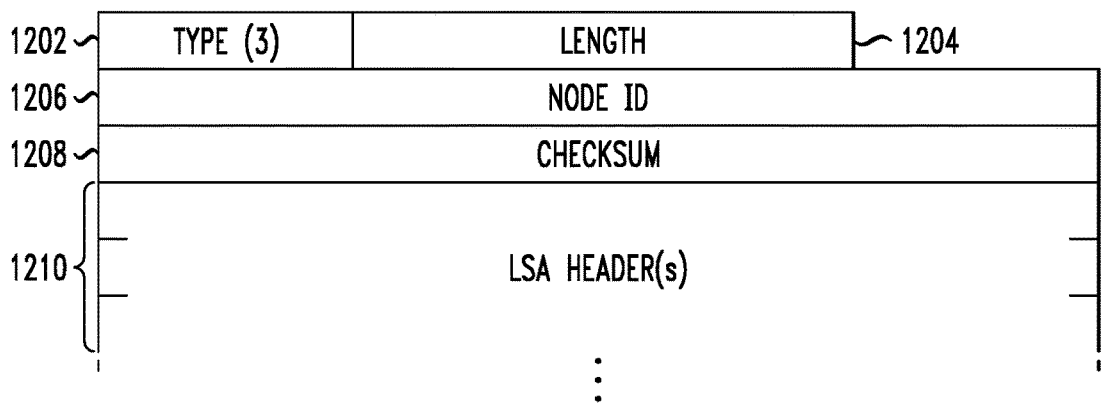
FIG. 19 shows a block diagram of the TDH of FIG. 12 corresponding to a third type of topology-discovery information according to an embodiment.

FIG. 19 shows a block diagram of TDH 820 corresponding to a third type (Type 3) of topology-discovery information according to an embodiment. The fields 1202-1208 of this TDH are the same as in FIG. 12. The field 1202 indicates "Type 3." The multi-field portion 1210 comprises one or more LSA Headers, e.g., 1500 (FIG. 15).

As already indicated above, Type 3 represents LSA ACK/ACK Bundle and is used to make the flooding of LSAs more reliable. One or more LSAs can be acknowledged using a single TDH 820 (Type 3). LSA Headers placed into the multi-field portion 1210 are copies of the original LSA Headers 1500 (FIG. 15), except for the values of the length fields 1516, which are changed accordingly due to the absence of the corresponding LSA bodies. A person of ordinary skill in the art will readily understand that such LSA Headers still contain sufficient information to uniquely identify the corresponding flooded LSAs.

Figure 20:
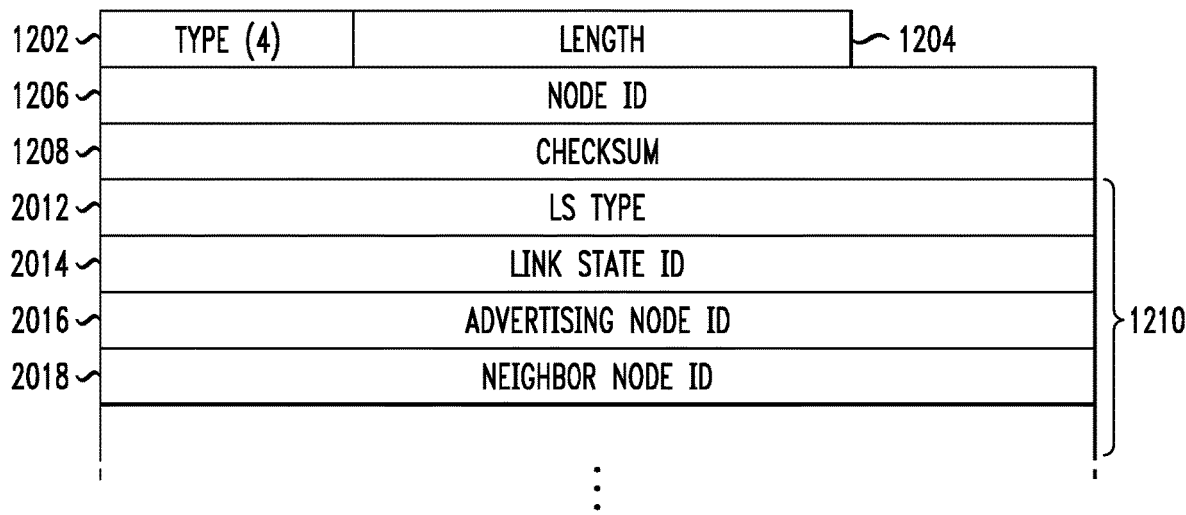
FIG. 20 shows a block diagram of the TDH of FIG. 12 corresponding to a fourth type of topology-discovery information according to an embodiment.

FIG. 20 shows a block diagram of TDH 820 corresponding to a fourth type (Type 4) of topology-discovery information according to an embodiment. The fields 1202-1208 of this TDH are the same as in FIG. 12. The field 1202 indicates "Type 4." The multi-field portion 1210 comprises one or more LSA Requests, only one of which is shown in FIG. 20 for illustration purposes. Such an LSA request comprises a respective set of fields 2012-2018.

The field 2012 specifies the LSA type of the LSA that is being requested. Herein, the LSA types are the same as those specified in the field 1506 of LSA Header 1500 (FIG. 15).

The field 2014 specifies the Link State ID and is similar to the field 1508 of LSA Header 1500 (FIG. 15).

The field 2016 specifies the Advertising Node ID and is similar to the field 1510 of LSA Header 1500 (FIG. 15).

The field 2018 specifies the Neighbor Node ID and is similar to the field 1512 of LSA Header 1500 (FIG. 15).

Together, the fields 2012-2018 uniquely identify the corresponding LSA, but not its instance. Accordingly, a TDH 820 (Type 4) is intended to be a request for the most recent instance of the identified LSA, whatever that instance might be.

Figure 21:
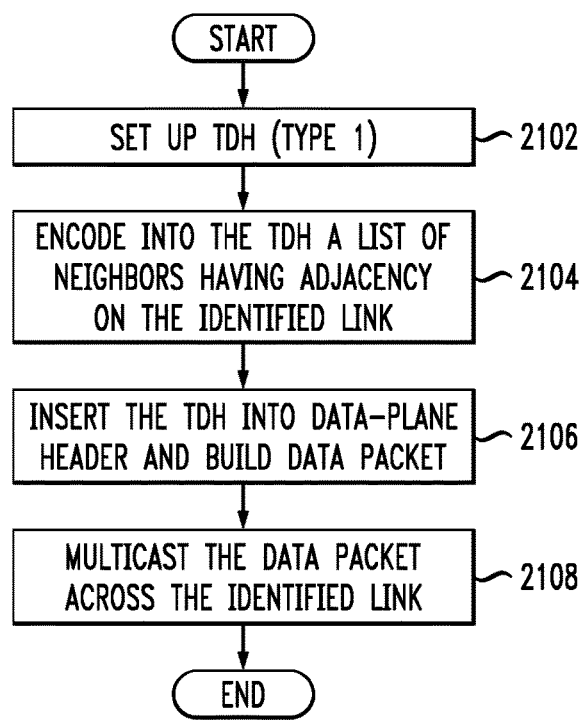
FIG. 21 shows a flowchart of a method of generating and sending a data packet having a TDH of FIG. 12 corresponding to the first type of topology-discovery information according to an embodiment.

FIG. 21 shows a flowchart of a method 2100 of generating and sending a data packet having a TDH 820 (Type 1) in data-plane header 810 thereof according to an embodiment. The inputs to method 2100 include identification of the link on which to send the data packet.

Method 2100 begins at step 2102, whereat the corresponding node (e.g., employing network device 900) operates to set up a TDH 820 (Type 1). In an example embodiment, step 2102 may comprise the sub-steps of: (i) selecting and fetching an appropriate template of TDH 820 (Type 1), e.g., from memory 14; and (ii) encoding appropriate parts thereof with the corresponding parameters used by the node, such as the ND Interval 1312, Node Priority 1314, Node Dead Interval 1316, etc. (also see FIG. 13).

At step 2104, the node further operates to encode into the field 1322 of the TDH 820 (Type 1) a list of neighbors that have adjacency on the link identified in the input to method 2100 (also see FIG. 13).

At step 2106, the node operates to insert the resulting TDH 820 (Type 1) into a data-plane header corresponding to the PST employed in the corresponding network 100 and build a corresponding data packet.

At step 2108, the node operates to send the resulting data packet to a multicast address for all nodes across the identified link. The processing of method 2100 is then terminated.

Figure 22:
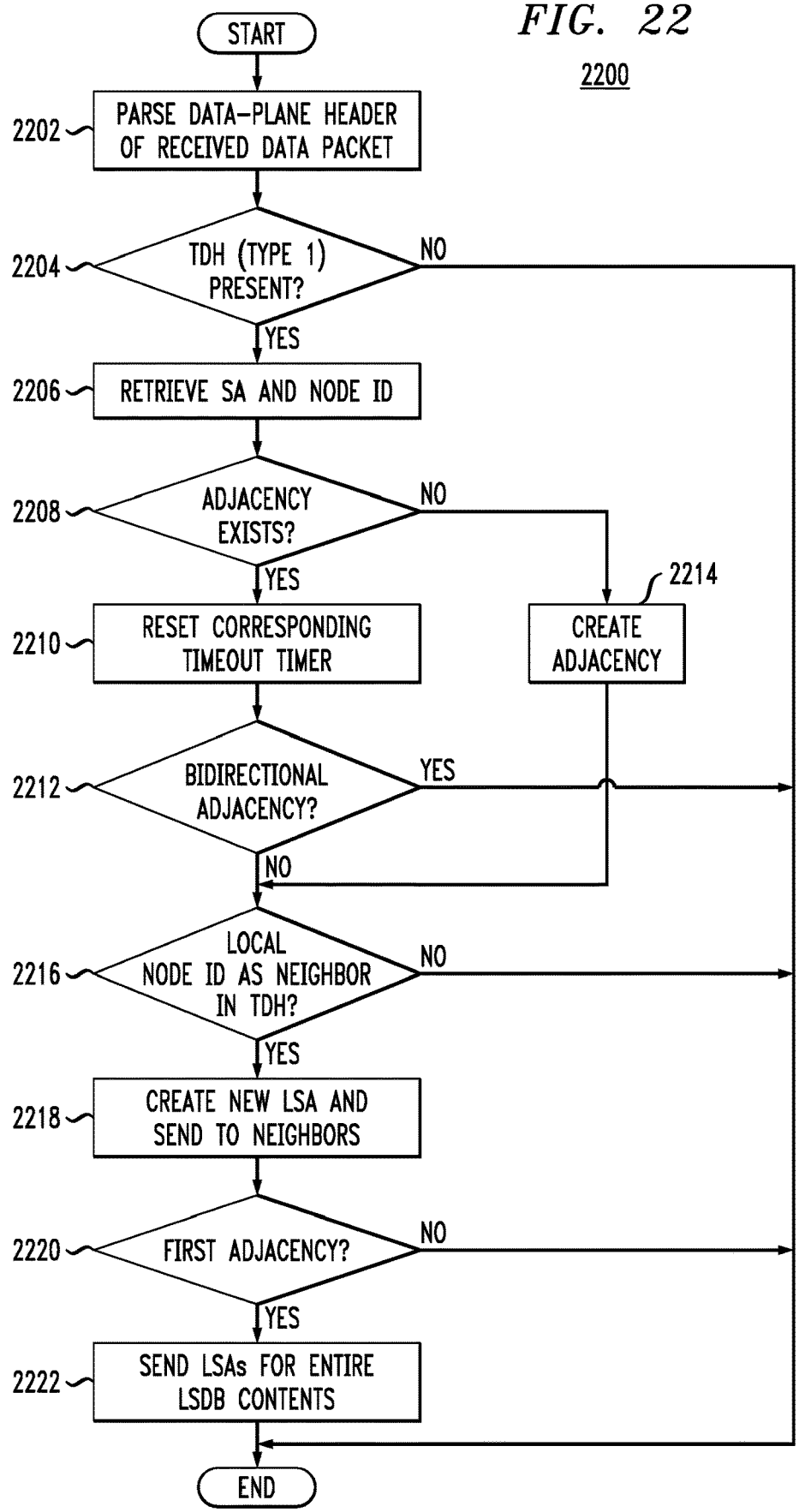
FIG. 22 shows a flowchart of a method of processing a received data packet having a TDH of FIG. 12 corresponding to the first type of topology-discovery information according to an embodiment.

FIG. 22 shows a flowchart of a method 2200 of processing a received data packet having a TDH 820 (Type 1) in data-plane header 810 thereof according to an embodiment. The inputs to method 2200 include the received data packet and identification of the link on which the data packet was received.

Method 2200 begins at step 2202, whereat data-plane-header filter 44 parses the data-plane header of the received packet.

At step 2204, based on the parsing performed at step 2202, TDH filter 46 determines whether or not the data-plane header includes a TDH 820 (Type 1). If a TDH 820 (Type 1) is present, then the processing of method 2200 is directed to step 2206. Otherwise, the processing of method 2200 is terminated.

At step 2206, data-plane-header filter 44 operates to retrieve source address 612 from the data-plane header. The retrieved source address provides the identifier/address of the link at the neighbor that sent the data packet containing the TDH 820 (Type 1) detected at step 2204. TDH filter 46 then operates to retrieve Node ID 1206 from the TDH, which provides the identifier of the neighbor.

At step 2208, data-plane-header filter 44 operates to determine whether or not adjacency exists for the tuple {source address, neighbor} on the corresponding link. If the adjacency exists, then the processing of method 2200 is directed to step 2210. Otherwise, the processing of method 2200 is directed to step 2214.

At step 2210, control unit 22 operates to reset the timeout timer corresponding to the adjacency. The timeout timer may be running at this time because the adjacency already exists, meaning that the timeout timer may have been previously triggered.

At step 2212, control unit 22 operates to determine whether or not the existing adjacency is bidirectional. If the existing adjacency is not bidirectional, then the processing of method 2200 is directed to step 2216. Otherwise, the processing of method 2200 is terminated.

At step 2214, control unit 22 operates to create an adjacency for the tuple {source address, neighbor} on the corresponding link.

At step 2216, TDH filter 46 operates to determine whether or not the field 1322 of the TDH has the local Node ID in the set of identifiers therein. If a match is found, then the processing of method 2200 is directed to step 2218. Otherwise, the processing of method 2200 is terminated.

At step 2218, control unit 22 operates to create a new LSA for the corresponding link with: (i) Link State ID as the source address 612 of the data packet; (ii) the local Node ID as Advertising Node ID 1510; and (iii) the Neighbor Node ID 1512. Control unit 22 then proceeds to send the new LSA to all known neighbors of the host node. In an example embodiment, step 2218 can be implemented using method 2500.

At step 2220, control unit 22 operates to determine whether or not the adjacency corresponding to the preceding step 2210 or 2214 is a first adjacency to the corresponding neighbor. This determination is typically needed because there can be multiple links to a neighbor, typically with one adjacency per link. If it is determined that this adjacency is the first adjacency, then the processing of method 2200 is directed to step 2222. Otherwise, the processing of method 2200 is terminated.

At step 2222, control unit 22 operates to send LSAs corresponding to the contents of the entire LSDB to the corresponding neighbor. In an example embodiment, step 2222 can be implemented using methods 2300 and 2400. The processing of method 2200 is then terminated.

Figure 23:
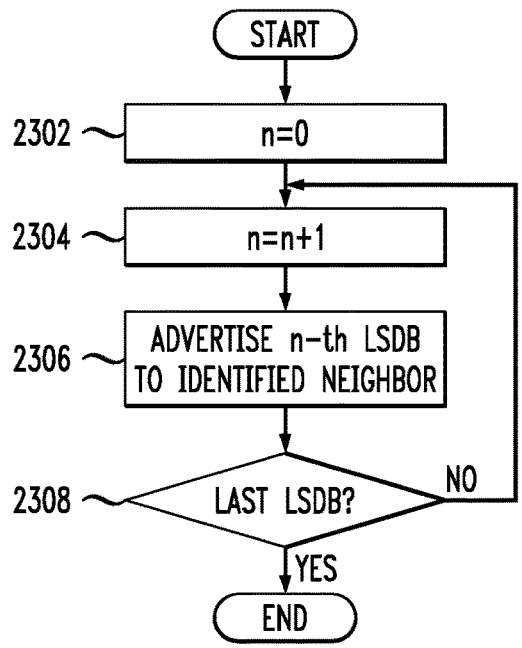
FIG. 23 shows a flowchart of a method that can be used to implement one or more steps of the method shown in FIG. 22 according to an embodiment.

FIG. 23 shows a flowchart of a method 2300 that can be executed by a node to advertise all LSDBs thereof to a neighbor using one or more data-plane headers according to an embodiment. Each LSDB typically contains LSAs of a specific LSA Type. For example, a TEDB is the LSDB for LSA Type 3. The inputs to method 2300 include the identifier of the neighbor to whom the LSDBs are to be advertised.

Method 2300 begins at step 2302, whereat the method is initialized by setting the LSDB index n to n=0.

At step 2304, the LSDB index n is incremented by 1, i.e., n←(n+1).

At step 2306, control unit 22 operates to get the n-th LSDB and then advertises the LSAs of the n-th LSDB to the identified neighbor using one or more data-plane headers. In an example embodiment, step 2306 can be implemented using method 2400.

At step 2308, control unit 22 operates to determine whether or not the n-th LSDB is the last LSDB to be advertised. If the n-th LSDB is not the last LSDB, then the processing of method 2300 is looped back to step 2304. Otherwise, the processing of method 2300 is terminated.

Figure 24:
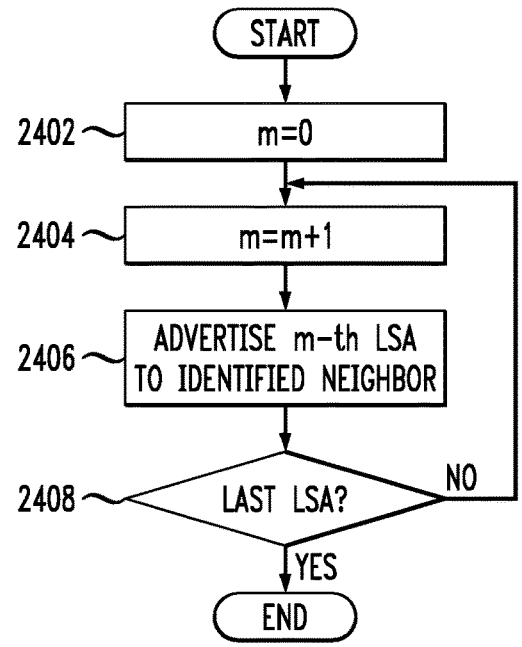
FIG. 24 shows a flowchart of a method that can be used to implement one or more steps of the method shown in FIG. 23 according to an embodiment.

FIG. 24 shows a flowchart of a method 2400 that can be executed by a node to advertise LSAs of an LSDB thereof to a neighbor using one or more data-plane headers according to an embodiment. The inputs to method 2400 include the index n of the LSDB to be advertised and identification of the neighbor to whom the LSDB is to be advertised.

Method 2400 begins at step 2402, whereat the method is initialized by setting the LSA index m to m=0.

At step 2404, the LSA index m is incremented by 1, i.e., m←(m+1).

At step 2406, control unit 22 operates to get the m-th LSA from the n-th LSDB and advertises the m-th LSA to the identified neighbor using one or more data-plane headers. In an example embodiment, step 2406 can be implemented using method 2600.

At step 2408, control unit 22 operates to determine whether or not the m-th LSA is the last LSA of the n-th LSDB. If the m-th LSA is not the last LSA, then the processing of method 2400 is looped back to step 2404. Otherwise, the processing of method 2400 is terminated.

Figure 25:
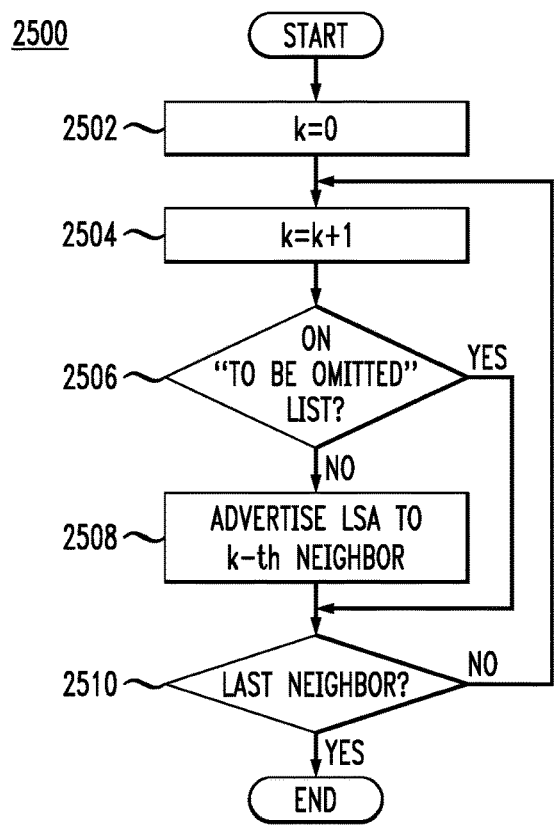
FIG. 25 shows a flowchart of a method that can be executed by a node to flood an LSA to multiple neighbors using one or more data-plane headers according to an embodiment.

FIG. 25 shows a flowchart of a method 2500 that can be executed by a node to flood an LSA to multiple neighbors using one or more data-plane headers according to an embodiment. The inputs to method 2500 include: (i) the LSA to be flooded; and (ii) a list of neighbors that, if provided, indicates the neighbor(s) to be omitted from the flooding of the LSA.

Method 2500 begins at step 2502, whereat the method is initialized by setting the neighbor index k to k=0.

At step 2504, the neighbor index k is incremented by 1, i.e., k←(k+1).

At step 2506, control unit 22 operates to determine whether or not the k-th neighbor is present in the provided list of "to be omitted" neighbors. If the k-th neighbor is not on the list, then the processing of method 2500 is directed to step 2508. Otherwise, the processing of method 2500 is directed to step 2510.

At step 2508, control unit 22 operates to advertise the LSA to the k-th neighbor.

At step 2510, control unit 22 operates to determine whether or not the k-th neighbor is the last neighbor to which the LSA needs to be advertised. If the k-th neighbor is not the last, then the processing of method 2500 is looped back to step 2504. Otherwise, the processing of method 2500 is terminated.

Figure 26:
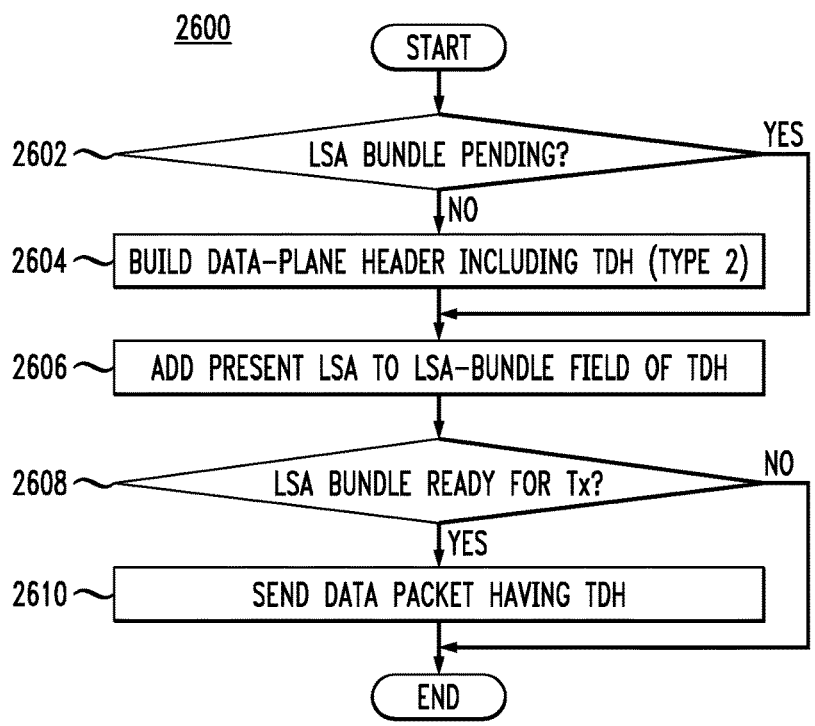
FIG. 26 shows a flowchart of a method of generating and sending a data packet having a TDH of FIG. 12 corresponding to the second type of topology-discovery information according to an embodiment.

FIG. 26 shows a flowchart of a method 2600 that can be executed by a node to advertise an LSA to a neighbor using one or more data-plane headers according to an embodiment. The inputs to method 2600 include: (i) the LSA to be advertised; and (ii) identification of the target neighbor.

Method 2600 begins at step 2602, whereat control unit 22 determines whether or not an LSA Bundle is pending transmission to the identified neighbor. For efficiency, LSAs may be sent in bundles. As such, a previously created LSA Bundle may be pending transmission for a certain amount of time to accumulate more LSAs. If an LSA Bundle is not pending, then the processing of method 2600 is directed to step 2604. Otherwise, the processing of method 2600 is directed to step 2606.

At step 2604, control unit 22 operates to build a data-plane header including a TDH 820 (Type 2). In an example embodiment, step 2604 may comprise the sub-steps of selecting and fetching appropriate templates of the data-plane header and TDH 820 (Type 2), e.g., from memory 14. The field 1414 of the fetched TDH 820 (Type 2) may be empty (also see FIG. 14).

At step 2606, control unit 22 operates to add the present LSA to the field 1414 of TDH 820 (Type 2). Control unit 22 further operates to start a timer counting down a period of time during which a corresponding LSA ACK from the target neighbor may be received. Depending on whether or not the LSA ACK is received during the countdown, control unit 22 may perform certain other actions, e.g., as previously indicated.

At step 2608, control unit 22 operates to determine whether or not the pending LSA Bundle is ready for transmission. For example, the LSA Bundle may be deemed to be ready for transmission if it has accumulated a certain predetermined number of LSAs therein and/or if it has been pending for a sufficiently long period of time. If the LSA Bundle is ready for transmission, then the processing of method 2600 is directed to step 2610. Otherwise, the processing of method 2600 is terminated.

At step 2610, the host node operates to send the data packet having the TDH 820 (Type 2) with the LSA Bundle in the field 1414 thereof. In an example embodiment, step 2610 may include the sub-steps of: (i) finding a link on which the node has adjacency to the target neighbor; and (ii) sending the data packet over the link to the address of the link at the target neighbor. With respect to sub-step (i), it should be noted that the node may have adjacency to the target neighbor on multiple links, and some suitable selection criteria may need to be applied to select one of such links for the data-packet transmission. Upon completion of step 2610, the processing of method 2600 is terminated.

Figure 27:
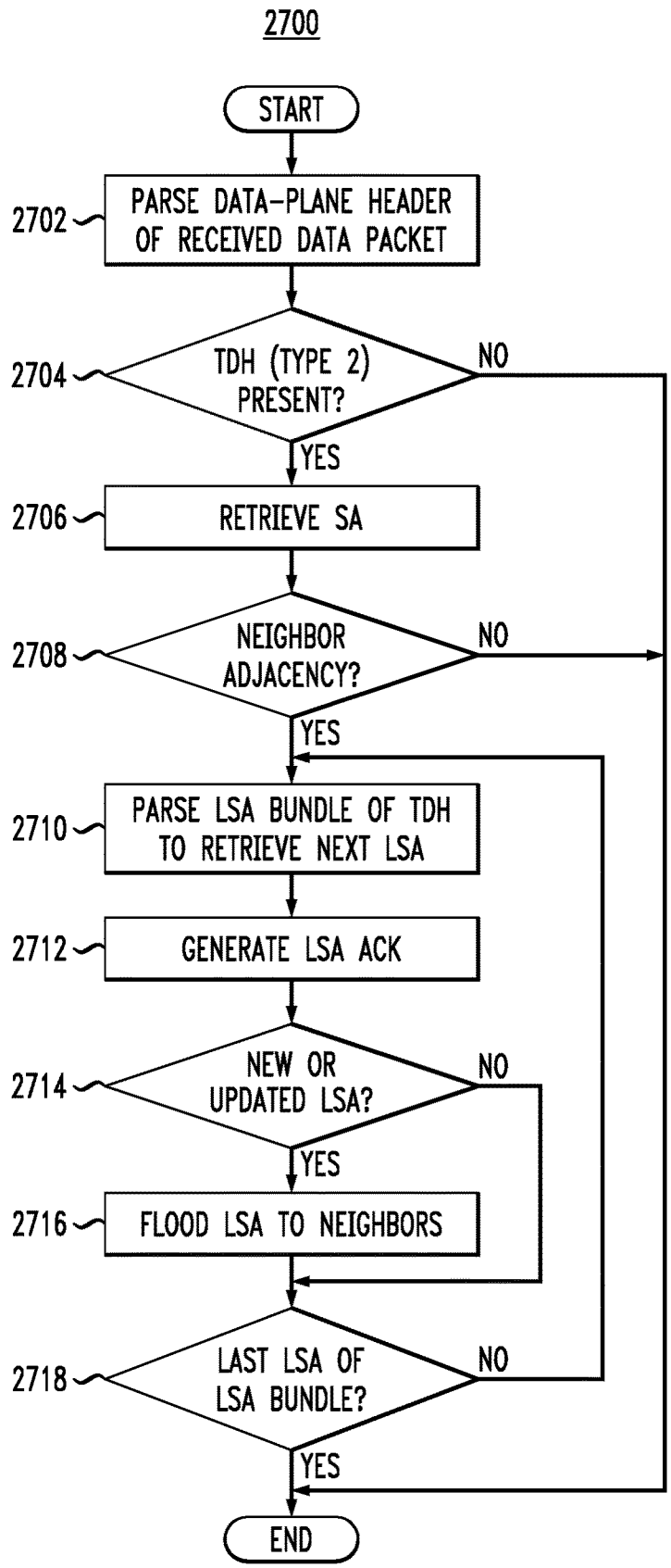
FIG. 27 shows a flowchart of a method of processing a received data packet having a TDH of FIG. 12 corresponding to the second type of topology-discovery information according to an embodiment.

FIG. 27 shows a flowchart of a method 2700 of processing a received data packet having a TDH 820 (Type 2) according to an embodiment. The inputs to method 2700 include the received data packet and identification of the link on which the data packet was received.

Method 2700 begins at step 2702, whereat data-plane-header filter 44 parses the data-plane header of the received packet.

At step 2704, based on the parsing performed at step 2702, TDH filter 46 determines whether or not the data-plane header includes a TDH 820 (Type 2). If a TDH 820 (Type 2) is present, then the processing of method 2700 is directed to step 2706. Otherwise, the processing of method 2700 is terminated.

At step 2706, data-plane-header filter 44 operates to retrieve source address 612 from the data-plane header.

At step 2708, control unit 22 uses the source address retrieved at step 2706 to determine whether or not there is a corresponding neighbor adjacency on the link. If the determination is in the affirmative, then the processing of method 2700 is directed to step 2710. Otherwise, the processing of method 2700 is terminated. In the latter case, the corresponding data packet may be dropped.

At step 2710, TDH filter 46 parses the field 1414 of the TDH 820 (Type 2) detected at step 2704 to retrieve a next LSA therefrom. In the case of the first instance of step 2710 in the processing of the corresponding TDH 820 (Type 2), the next LSA is the first (e.g., topmost) LSA.

At step 2712, control unit 22 generates an LSA ACK for the LSA retrieved at step 2710. The generated LSA ACK may then be further processed for being sent to the sender of the corresponding LSA. Such processing may include, e.g., using an LSA ACK Bundle, as previously mentioned (also see FIG. 28).

At step 2714, control unit 22 operates to determine whether or not the LSA retrieved at step 2710 is a new or updated LSA. Such determination can be made, e.g., by: (i) accessing the corresponding LSDB; and (ii) searching for a corresponding LSA entry therein. If such an entry is not found in the corresponding LSDB, then the LSA retrieved at step 2710 is a new LSA. If such an entry is found in the corresponding LSDB but differs from the LSA retrieved at step 2710 in at least one pertinent parameter, then the LSA retrieved at step 2710 is deemed to be an updated LSA, and so forth. If the LSA retrieved at step 2710 is a new or updated LSA, then the processing of method 2700 is directed to step 2716. Otherwise, the processing of method 2700 is directed to step 2718.

At step 2716, the host node operates to flood the LSA to all neighbors, except for the sender of the LSA. In an example embodiment, step 2716 can be implemented, e.g., using method 2500 (see FIG. 25).

At step 2718, control unit 22 operates to determine whether or not the LSA retrieved at step 2710 is the last LSA in the field 1414 of the TDH 820 (Type 2) detected at step 2704. If the LSA is not the last LSA of the corresponding LSA Bundle, then the processing of method 2700 is directed back to step 2710. Otherwise, the processing of method 2700 is terminated.

Figure 28:
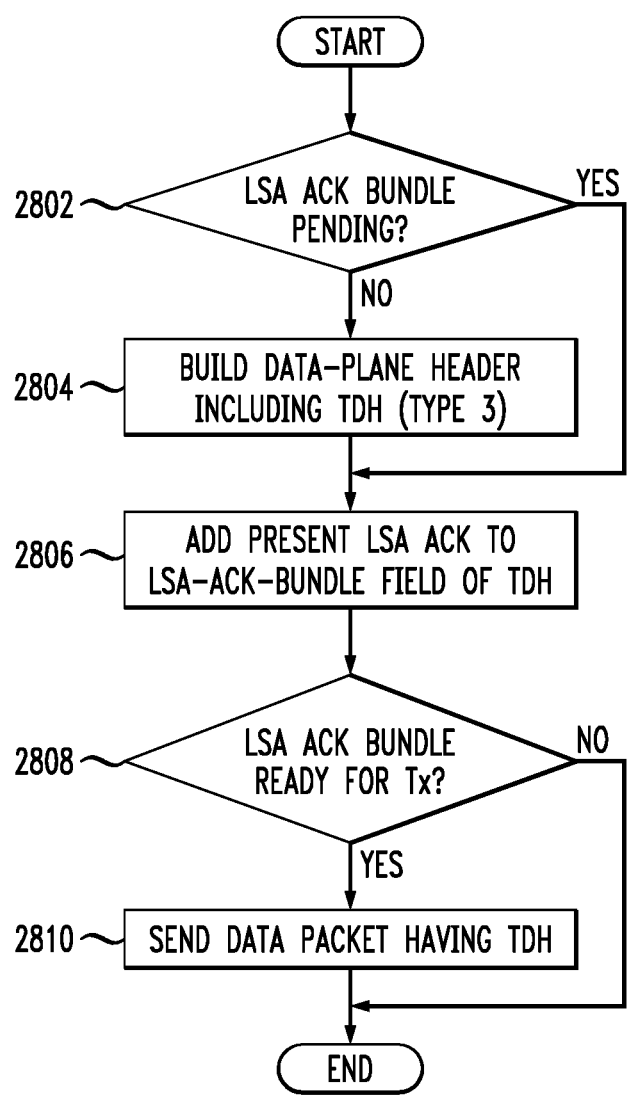
FIG. 28 shows a flowchart of a method of generating and sending a data packet having a TDH of FIG. 12 corresponding to the third type of topology-discovery information according to an embodiment.

FIG. 28 shows a flowchart of a method 2800 that can be executed by a node to send an LSA ACK to a neighbor using one or more data-plane headers according to an embodiment. The inputs to method 2800 include: (i) the LSA ACK to be sent; and (ii) identification of the target neighbor.

At step 2802 of method 2800, control unit 22 determines whether or not an LSA ACK Bundle is pending transmission to the identified neighbor. For efficiency, LSA ACKs may be sent in bundles. As such, a previously created LSA ACK Bundle may be pending transmission for a certain amount of time to accumulate more LSA ACKs. If an LSA ACK Bundle is not pending, then the processing of method 2800 is directed to step 2804. Otherwise, the processing of method 2800 is directed to step 2806.

At step 2804, control unit 22 operates to build a data-plane header including a TDH 820 (Type 3). In an example embodiment, step 2804 may comprise the sub-steps of selecting and fetching appropriate templates of the data-plane header and TDH 820 (Type 3), e.g., from memory 14. The field 1210 of the fetched TDH 820 (Type 3) may be empty.

At step 2806, control unit 22 operates to add the present LSA ACK to the field 1210 of TDH 820 (Type 3).

At step 2808, control unit 22 operates to determine whether or not the pending LSA ACK Bundle is ready for transmission. For example, the LSA ACK Bundle may be deemed to be ready for transmission if it has accumulated a certain predetermined number of LSA ACKs therein and/or if it has been pending for a sufficiently long period of time. If the LSA ACK Bundle is ready for transmission, then the processing of method 2800 is directed to step 2810. Otherwise, the processing of method 2800 is terminated.

At step 2810, the host node operates to send the data packet having the TDH 820 (Type 3) with the LSA ACK Bundle in the field 1210 thereof. In an example embodiment, step 2810 may include the sub-steps of: (i) finding a link on which the node has adjacency to the target neighbor; and (ii) sending the data packet over the link to the address of the link at the target neighbor. Upon completion of step 2810, the processing of method 2800 is terminated.

Figure 29:
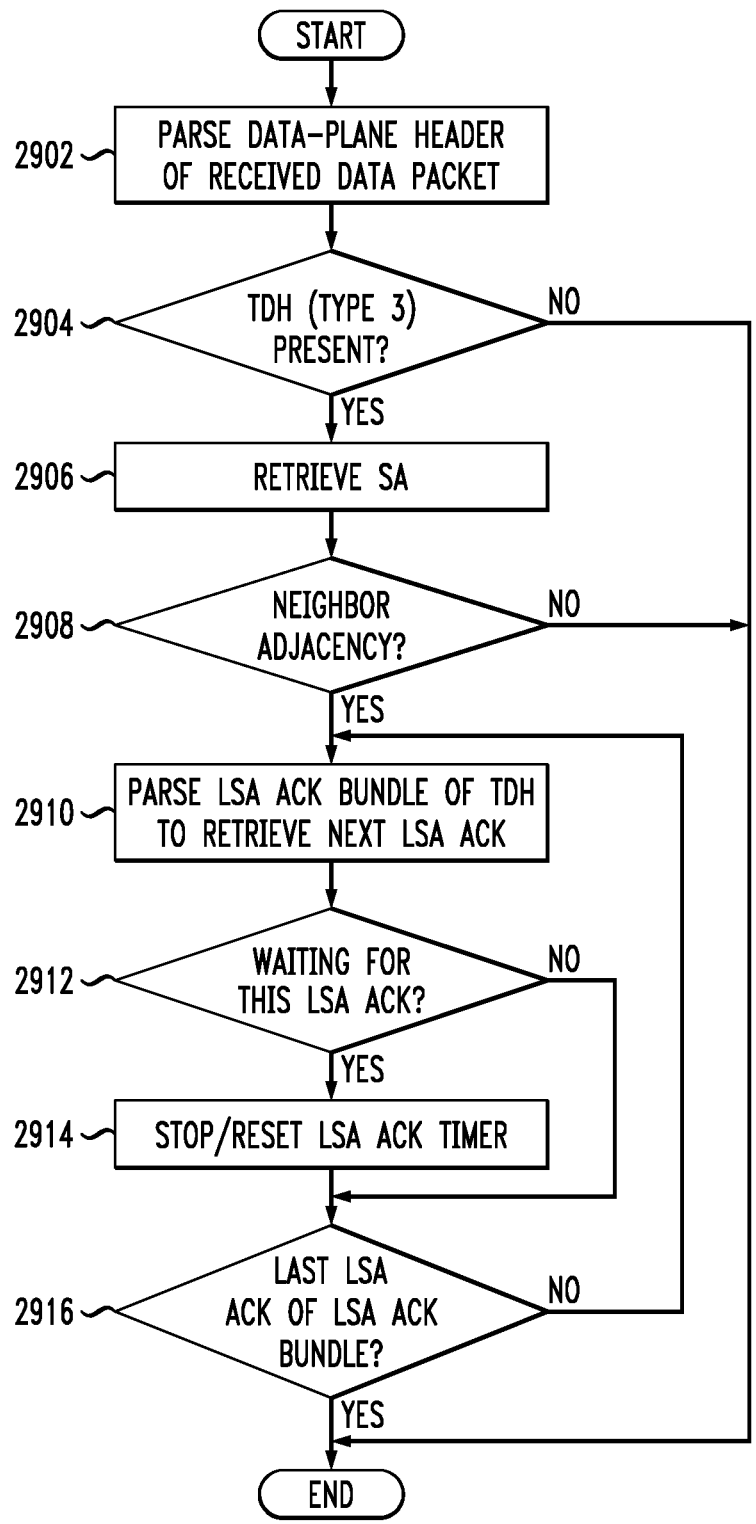
FIG. 29 shows a flowchart of a method of processing a received data packet having a TDH of FIG. 12 corresponding to the third type of topology-discovery information according to an embodiment.

FIG. 29 shows a flowchart of a method 2900 of processing a received data packet having a TDH 820 (Type 3) according to an embodiment. The inputs to method 2900 include the received data packet and identification of the link on which the data packet was received.

Method 2900 begins at step 2902, whereat data-plane-header filter 44 parses the data-plane header of the received packet.

At step 2904, based on the parsing performed at step 2902, TDH filter 46 determines whether or not the data-plane header includes a TDH 820 (Type 3). If a TDH 820 (Type 3) is present, then the processing of method 2900 is directed to step 2906. Otherwise, the processing of method 2900 is terminated.

At step 2906, data-plane-header filter 44 operates to retrieve source address 612 from the data-plane header.

At step 2908, control unit 22 uses the source address retrieved at step 2906 to determine whether or not there is a corresponding neighbor adjacency on the link. If the determination is in the affirmative, then the processing of method 2900 is directed to step 2910. Otherwise, the processing of method 2900 is terminated. In the latter case, the corresponding data packet may be dropped.

At step 2910, TDH filter 46 parses the field 1210 of the TDH 820 (Type 3) detected at step 2904 to retrieve a next LSA ACK therefrom. In the case of the first instance of step 2910 in the processing of the corresponding TDH 820 (Type 3), the next LSA ACK is the first (e.g., topmost) LSA ACK.

At step 2912, control unit 22 operates to determine whether or not the host node is waiting for an LSA ACK of the corresponding LSA. If the determination is in the affirmative, then the processing of method 2900 is directed to step 2914. Otherwise, the processing of method 2900 is directed to step 2916.

At step 2914, control unit 22 operates to stop and reset the corresponding LSA ACK timer and change the wait status to "not awaiting ACK."

At step 2916, control unit 22 operates to determine whether or not the LSA ACK retrieved at step 2910 is the last LSA ACK in the field 1210 of the TDH 820 (Type 3) detected at step 2904. If the LSA ACK is not the last LSA of the corresponding LSA ACK Bundle, then the processing of method 2900 is directed back to step 2910. Otherwise, the processing of method 2900 is terminated.

Figure 30:
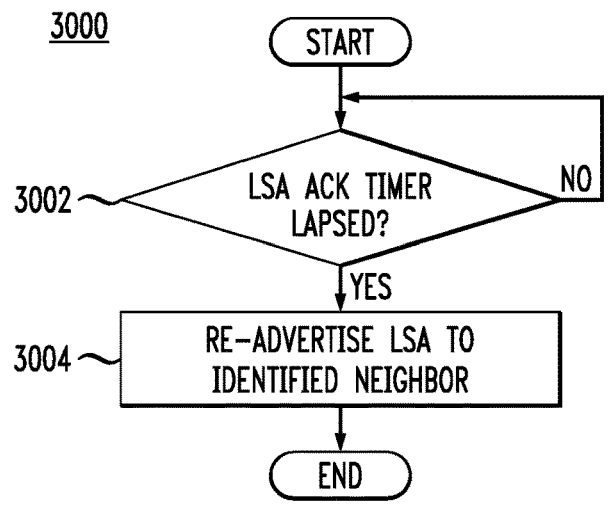
FIG. 30 shows a flowchart of a method of handling LSA Acknowledgement (ACK) timeouts according to an embodiment.

FIG. 30 shows a flowchart of a method 3000 of handling LSA ACK timeouts according to an embodiment. An LSA ACK timeout occurs when an LSA ACK timer started, e.g., at step 2606 (FIG. 26) or other pertinent processing step, runs out. The inputs to method 2900 include: (i) the LSA previously advertised; and (ii) identification of the corresponding target neighbor.

Step 3002 of method 3000 serves to determine whether or not the LSA ACK timer corresponding the LSA has run out. If the determination is in the affirmative, then the processing of method 3000 is directed to step 3004. Otherwise, step 3002 is repeated.

At step 3004, the host node operates to re-advertise the LSA to the target neighbor. In an example embodiment, step 3004 may be implemented using method 2600. Upon completion of step 3004, the processing of method 3000 is terminated.

Figure 31:
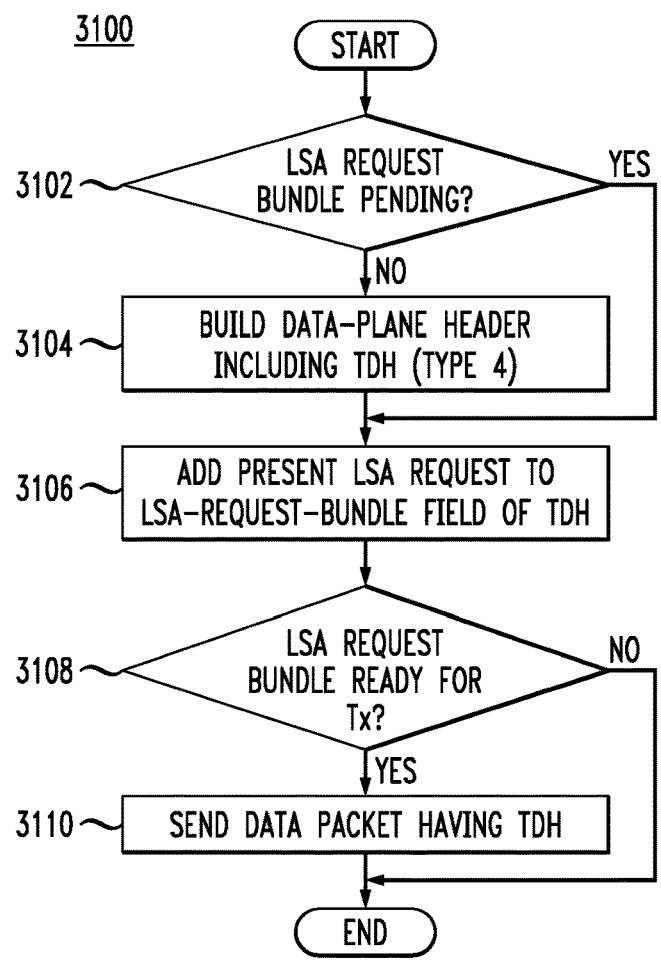
FIG. 31 shows a flowchart of a method of generating and sending a data packet having a TDH of FIG. 12 corresponding to the fourth type of topology-discovery information according to an embodiment.

FIG. 31 shows a flowchart of a method 3100 that can be executed by a node to request an LSA from a neighbor using one or more data-plane headers according to an embodiment. The inputs to method 3100 include: (i) an LSA request to be sent; and (ii) identification of the target neighbor.

Method 3100 begins at step 3102, whereat control unit 22 operates to determine whether or not an LSA Request Bundle is pending transmission to the identified neighbor. For efficiency, LSA Requests may be sent in bundles. As such, a previously created LSA Request Bundle may be pending transmission for a certain amount of time to accumulate more LSA Requests. If an LSA Request Bundle is not pending, then the processing of method 3100 is directed to step 3104. Otherwise, the processing of method 3100 is directed to step 3106.

At step 3104, control unit 22 operates to build a data-plane header including a TDH 820 (Type 4). In an example embodiment, step 3104 may comprise the sub-steps of selecting and fetching appropriate templates of the data-plane header and TDH 820 (Type 4), e.g., from memory 14. The field 1210 of the fetched TDH 820 (Type 4) may be empty.

At step 3106, control unit 22 operates to add the present LSA Request to the field 1210 of TDH 820 (Type 4). As previously indicated, the field 1210 of TDH 820 (Type 4) may comprise one or more sets of fields 2012-2018 (e.g., see FIG. 20). Control unit 22 further operates to start a timer counting down a period of time during which a corresponding LSA ACK from the target neighbor may be received. Depending on whether or not the LSA ACK is received during the countdown, control unit 22 may perform certain other actions, e.g., as previously indicated.

At step 3108, control unit 22 operates to determine whether or not the pending LSA Request Bundle is ready for transmission. For example, the LSA Request Bundle may be deemed to be ready for transmission if it has accumulated a certain predetermined number of LSA Requests therein and/or if it has been pending for a sufficiently long period of time. If the LSA Request Bundle is ready for transmission, then the processing of method 3100 is directed to step 3110. Otherwise, the processing of method 3100 is terminated.

At step 3110, the host node operates to send the data packet having the TDH 820 (Type 4) with the LSA Request Bundle in the field 1210 thereof. In an example embodiment, step 3110 may include the sub-steps of: (i) finding a link on which the node has adjacency to the target neighbor; and (ii) sending the data packet over the link to the address of the link at the target neighbor. Upon completion of step 3110, the processing of method 3100 is terminated.

Figure 32:
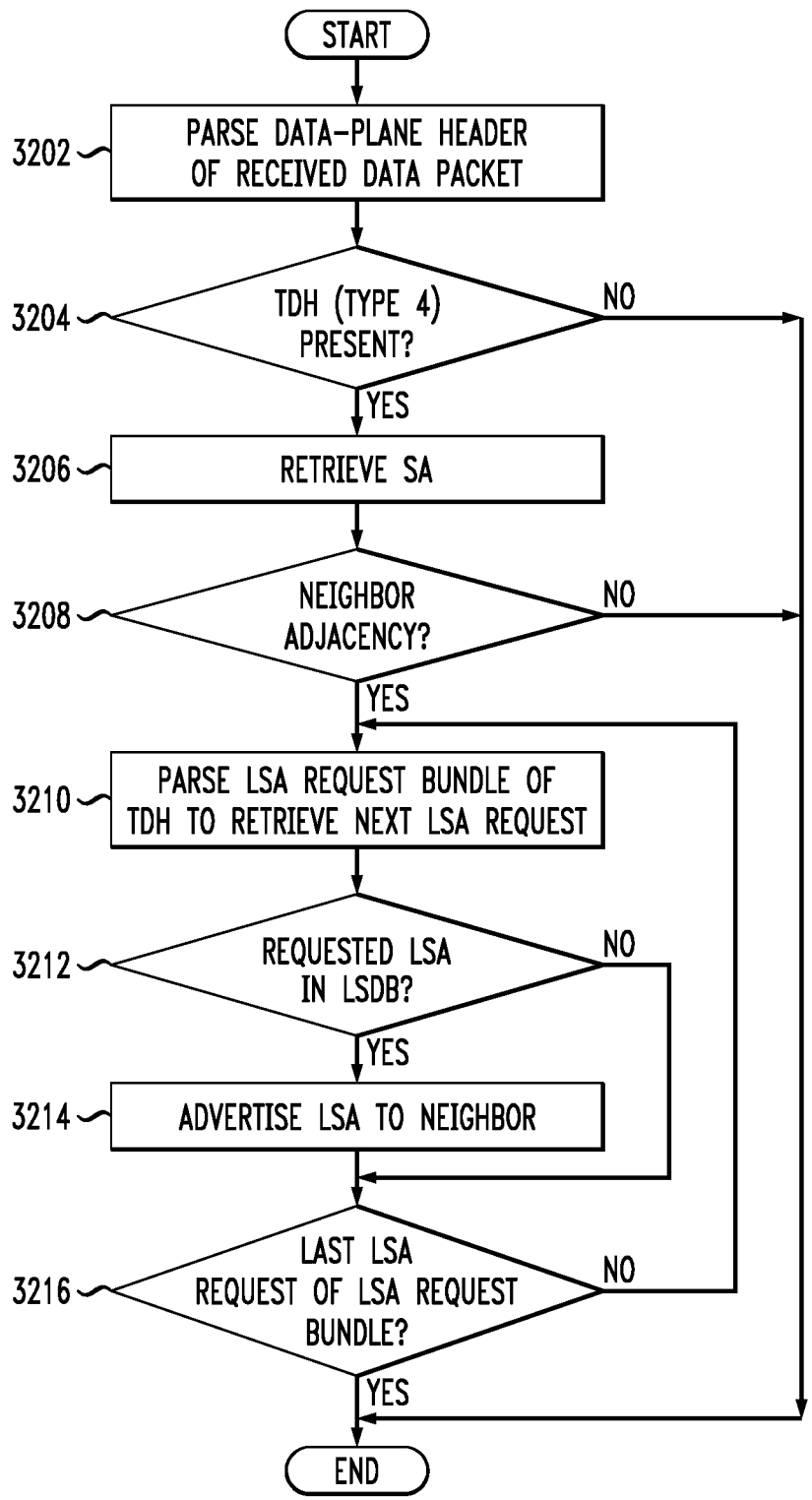
FIG. 32 shows a flowchart of a method of processing a received data packet having a TDH of FIG. 12 corresponding to the fourth type of topology-discovery information according to an embodiment.

FIG. 32 shows a flowchart of a method 3200 of processing a received data packet having a TDH 820 (Type 4) according to an embodiment. The inputs to method 3200 include the received data packet and identification of the link on which the data packet was received.

Method 3200 begins at step 3202, whereat data-plane-header filter 44 parses the data-plane header of the received packet.

At step 3204, based on the parsing performed at step 3202, TDH filter 46 determines whether or not the data-plane header includes a TDH 820 (Type 4). If TDH 820 (Type 4) is present, then the processing of method 3200 is directed to step 3206. Otherwise, the processing of method 3200 is terminated.

At step 3206, data-plane-header filter 44 operates to retrieve source address 612 from the data-plane header.

At step 3208, control unit 22 uses the source address retrieved at step 3206 to determine whether or not there is a corresponding neighbor adjacency on the link. If the determination is in the affirmative, then the processing of method 3200 is directed to step 3210. Otherwise, the processing of method 3200 is terminated. In the latter case, the corresponding data packet may be dropped.

At step 3210, TDH filter 46 parses the field 1210 of the TDH 820 (Type 4) detected at step 3204 to retrieve a next LSA Request therefrom. In the case of the first instance of step 3210 in the processing of the corresponding TDH 820 (Type 4), the next LSA Request is the first (e.g., topmost) LSA Request.

At step 3212, control unit 22 operates to determine weather or not the host node has the requested LSA in its LSDB(s). If the requested LSA is found therein, then the processing of method 3200 is directed to step 3214. Otherwise, the processing of method 3200 is directed to step 3216.

At step 3214, the host node operates to advertise the requested LSA to the identified neighbor. In an example embodiment, step 3214 can be implemented, e.g., using method 2600 (see FIG. 26).

At step 3216, control unit 22 operates to determine whether or not the LSA Request retrieved at step 3210 is the last LSA Request in the field 1210 of the TDH 820 (Type 4) detected at step 3204. If the LSA Request is not the last LSA request of the corresponding LSA Request Bundle, then the processing of method 3200 is directed back to step 3210. Otherwise, the processing of method 3200 is terminated.

FIGS. 33-39 further illustrate several specific embodiments of the above-disclosed methods and apparatus directed at automated network-topology-discovery processes employing data-plane headers. Such specific embodiments include example embodiments corresponding to IPv4, IPv6, and Ethernet networks.

Figure 33:
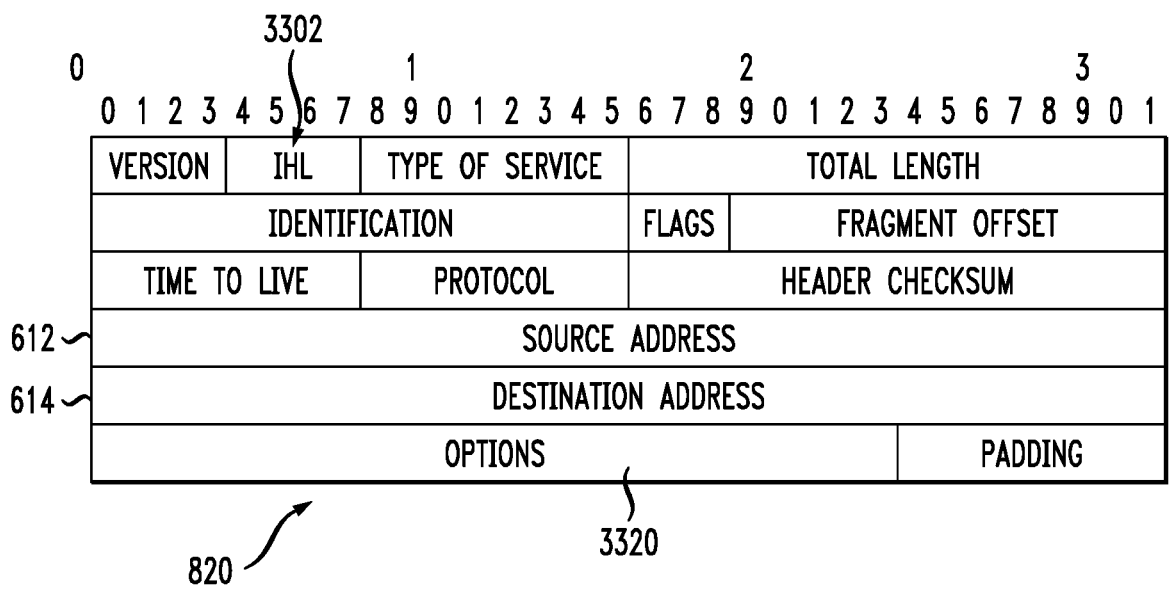
FIG. 33 shows a block diagram of an IPv4 header that may be used in some data packets transmitted in the communication network of FIG. 1 according to an embodiment.

FIG. 33 shows a block diagram of a data-plane header 3300 that may be used in some data packets transmitted in an IPv4 network 100 according to an embodiment. Data-plane header 3300 includes, among other fields, the above-described SA field 612 and DA field 614. The field 618 in header 3300 is implemented by the IPv4 Protocol field that contains a number indicating the type of data found in the payload portion of the packet. Data-plane header 3300 further includes a field 3320 (Options) that can be configured to carry a TDH 820.

Under IPv4, the field 3320 (Options) is generally used to provide for control functions needed or useful in some cases but unnecessary for certain types of communications in some other cases. For example, conventionally, the field 3320 may be used to carry certain provisions for timestamps, security, and special routing.

In an example implementation, the field 3320 starts with a 1-octet "Type" field followed by type-specific encoding. The field 3320 can be of variable length. Hence, the minimum possible size of the field 3320 is one octet, wherein only the "Type" field is present, and the type-specific encoding is not included. The maximum possible size of the field 3320 is limited by the value specified in an Internet Header Length (IHL) field 3302 of header 3300.

The 1-octet "Type" field is typically parsed into the following three constituent fields: (i) a 1-bit field "Copied Flag;" (ii) a 2-bit field "Option Class;" and (iii) a 5-bit field "Option Number." The bit value encoded into the "Copied Flag" field indicates whether or not this particular option is copied into all fragments upon fragmentation, wherein the binary "0" means not copied, and the binary "1" means copied. The four 2-bit values, i.e., "00," "01," "10," and "11," that can be encoded into the "Option Class" field represent the following option classes: "Control," "Reserved for Future Use," "Debugging and Measurement," and "Reserved for Future Use," respectively.

In an example embodiment, TDH 820 can be implemented using the field 3320 (Options), wherein the TDH is encoded as a novel "Topology Discovery Option." The three constituent fields of the "Type" field of such Topology Discovery Option can be assigned, e.g., the following values: (i) Copied Flag=1; (ii) Option Class=00; and (iii) Option Number=11111. Thus, the corresponding full octet of the "Type" field is "10011111," which has the decimal value of 159. The Copied Flag bit value of 1 means that the corresponding option is going to be copied into all fragments when the IPv4 packet carrying the option is fragmented by a router.

Figure 34:
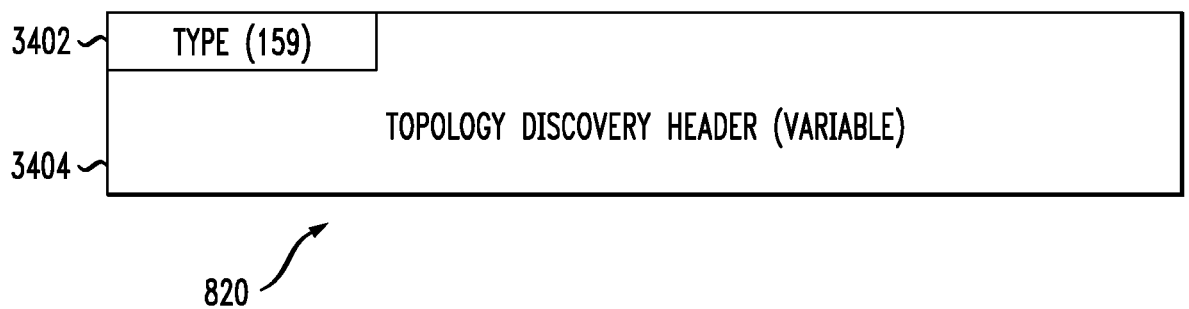
FIG. 34 shows a block diagram of a Topology Discovery Option that can be encoded in the IPv4 header of FIG. 33 according to an embodiment.

FIG. 34 shows a block diagram of the above-described Topology Discovery Option that can be encoded in the field 3320 according to an embodiment. Such Topology Discovery Option comprises a "Type" field 3402, wherein the binary value 10011111 is encoded as indicated above. The Topology Discovery Option further comprises a variable-length field 3404, wherein a TDH 820 of any type (i.e., Type 1, 2, 3, or 4) may be encoded (also see FIGS. 12-20).

In operation, when a router of network 100 receives an IPv4 packet, wherein the DA is an address of the router or a multicast address that indicates "all routers in the subnet," the router operates to check the field 3402 and see if the binary value 10011111 is encoded therein, thereby indicating that a Topology Discovery Option is present in the corresponding data-plane header 3300. If a Topology Discovery Option is present, then the router can process the corresponding TDH 820 read from the field 3404, e.g., using one or more of the above-described methods (e.g., see FIGS. 10-11 and 21-32).

FIGS. 35A-35B schematically illustrate insertion of extension headers into an IPv6 data packet as generally provided in the above-cited Internet Protocol, Version 6 (IPv6) Specification, RFC 2460. More specifically, FIG. 35A shows a simplified block diagram of an IPv6 packet 3500, which does not have an IPv6 extension header therein. FIG. 35B similarly shows a simplified block diagram of an IPv6 packet 3502, which has three IPv6 extension headers therein.

A main IPv6 header 3510 is fixed in size at 40 bytes long, as indicated in both FIG. 35A and FIG. 35B. One or more customized IPv6 Extension Headers (EHs) can be added as needed, as illustrated by the example shown in FIG. 35B. Each EH starts with a 1-octet Next Header field, followed by an EH body. The format of the EH body depends on the EH type.

For example, to insert three extension headers 3520, 3530, and 3540 into packet 3500 (thereby generating packet 3502, FIG. 35B), the pointer encoded into a Next Header field 3512 of main header 3510 is changed from UL (which points to an Upper Layer header 3550 in FIG. 35A) to EH1 (which points to an EH 3520 in FIG. 35B). EH 3520 comprises a Next Header field 3522 and an EH body 3524. The Next Header field 3522 implements the field 618 and is encoded with a pointer EH2, which points to an EH 3530. EH 3530 comprises a Next Header field 3532 and an EH body 3534. The Next Header field 3532 is encoded with a pointer EH3, which points to an EH 3540. EH 3540 comprises a Next Header field 3542 and an EH body 3544. The Next Header field 3542 is encoded with a pointer UL, which points to the above-mentioned Upper Layer header 3550. In this manner, different numbers of EHs can be chained together as needed. Conventionally, IPv6 EHs may be used to carry certain provisions for timestamps, security, and special routing.

Figure 36:
FIG. 36 shows a block diagram of an IPv6 extension header configured to carry a TDH of FIG. 12 according to an embodiment.

FIG. 36 shows a block diagram of an IPv6 EH 3600 that can be used in IPv6 packet 3502 according to an embodiment. For example, EH 3600 can be inserted, e.g., as described above, in addition to EHs 3520, 3530, and 3540 or instead of one or more of the EHs 3520, 3530, and 3540. EH 3600 comprises a Next Header field 3602 and an EH body 3604. EH body 3604 may comprise a TDH 820 of any type.

In operation, when a router of network 100 receives an IPv6 packet, wherein the DA is an address of the router or a multicast address that indicates "all routers in the subnet," the router operates to check and see if an EH 3600 is present. If an EH 3600 is present, then the router can process the corresponding TDH 820 read from the EH body 3604, e.g., using one or more of the above-described methods (see FIGS. 10-11 and 21-32).

Figure 37:
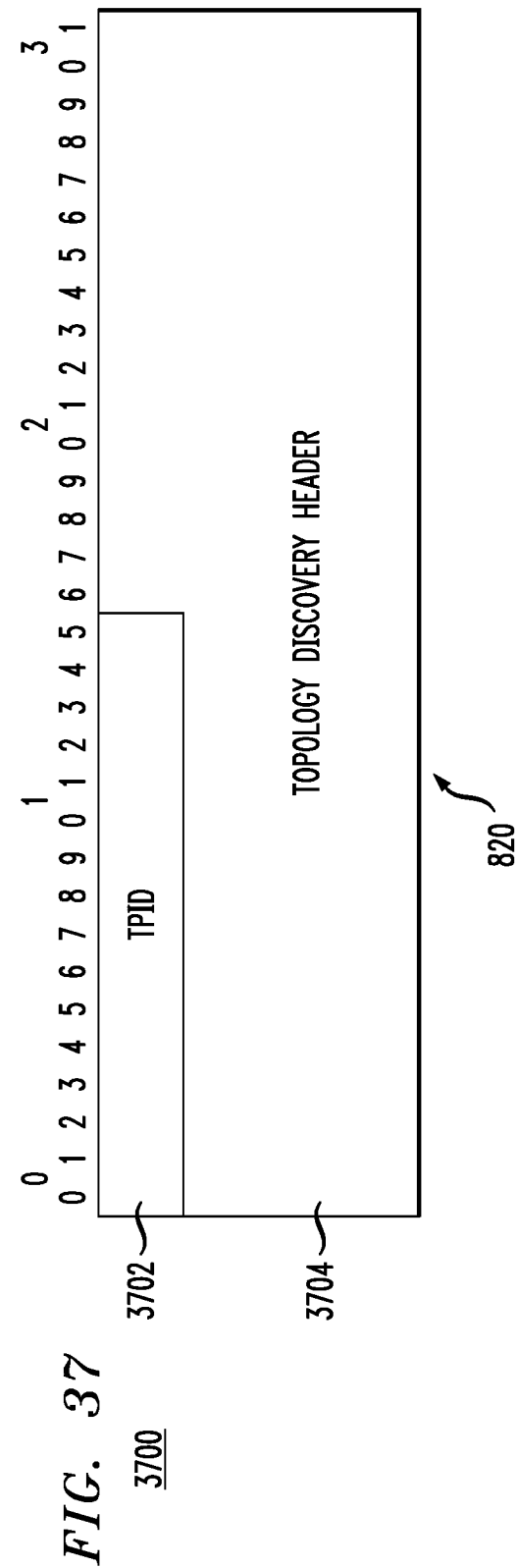
FIG. 37 shows a block diagram of a Topology Discovery Option (TDO) that can be encoded into an Ethernet header according to an embodiment.

FIG. 37 shows a block diagram of a Topology Discovery Option (TDO) 3700 that can be encoded into an Ethernet header according to an embodiment. TDO 3700 comprises a Tag Protocol Identifier (TPID) field 3702 and a TDH field 3704. In an example embodiment, the TPID field 3702 is a 16-bit field encoded with a value that can be used to identify the corresponding packet as carrying a TDO. The TPID field 3702 can be located at the same position as the EtherType field in untagged frames and, as such, can be used to distinguish a TDO-carrying frame from an untagged frame. The TDH field 3704 may comprise a TDH 820 of any type.

Figure 38:
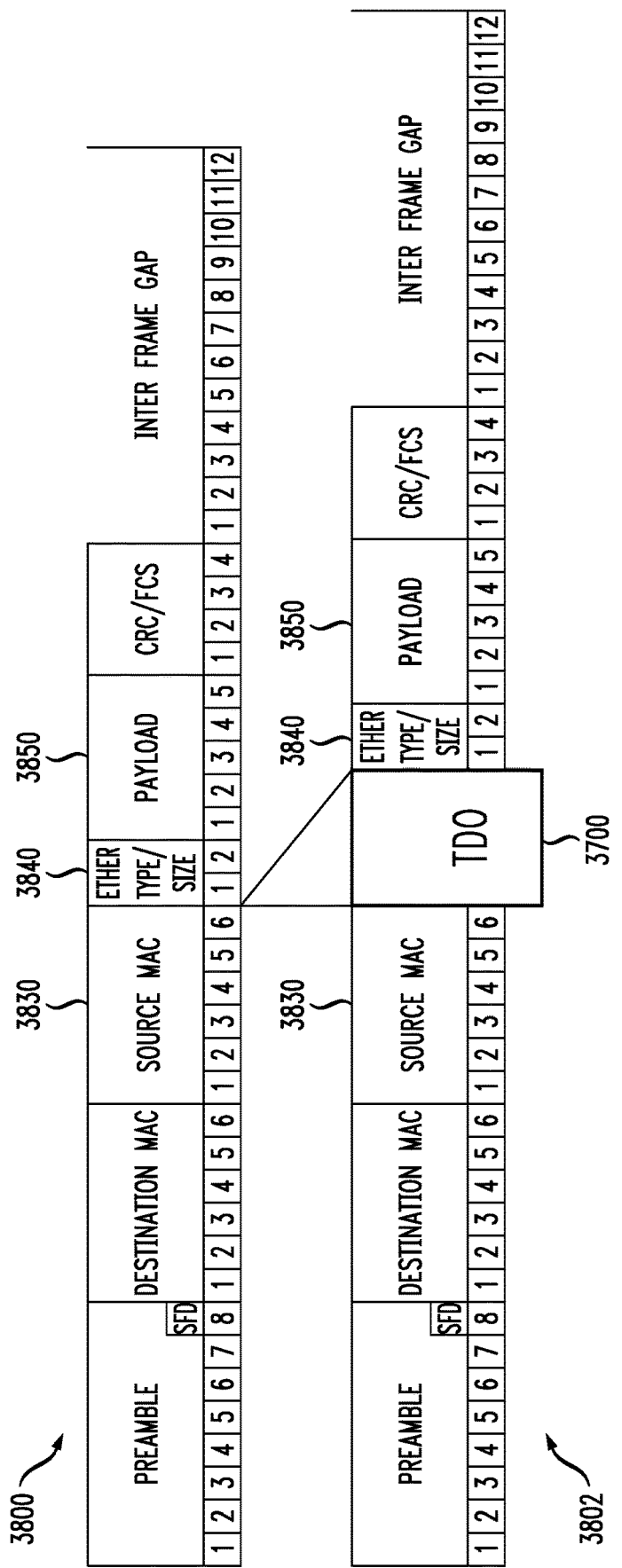
FIG. 38 pictorially illustrates insertion of a TDO into an untagged Ethernet packet according to an embodiment.

FIG. 38 pictorially illustrates insertion of a TDO 3700 into an untagged Ethernet packet 3800 according to an embodiment. A resulting modified Ethernet packet is packet 3802, wherein TDO 3700 is located between a Source MAC Address field 3830 and an EtherType field 3840. As such, TDO 3700 occupies the space of a conventional (optional) IEEE 802.1Q or IEEE 802.1ad tag. Due to this location, the TPID field 3702 doubles as an EtherType field that, if appropriately encoded, signals the presence of a TDH 820 in the corresponding Ethernet header. The EtherType field 3840, which signals the payload type of the Ethernet packet, is located in packet 3802 between the TDO 3700 and a Payload 3850.

Figure 39:
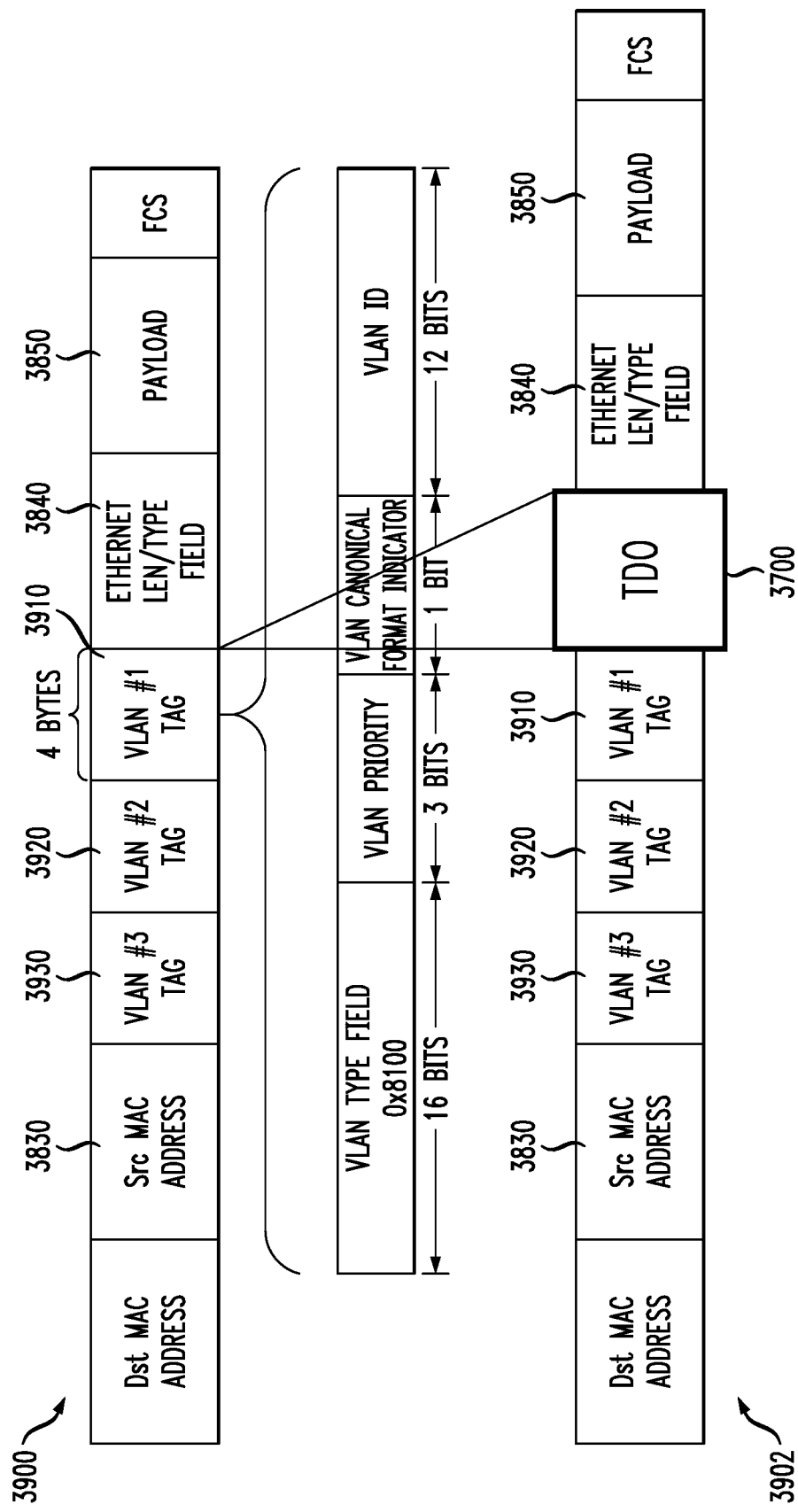
FIG. 39 pictorially illustrates insertion of a TDO into a tagged Ethernet packet according to an embodiment.

FIG. 39 pictorially illustrates insertion of a TDO 3700 into a tagged Ethernet packet 3900 according to an embodiment. A resulting modified Ethernet packet is packet 3902, wherein TDO 3700 is located between a first VLAN Tag field 3910 and an EtherType field 3840. For illustration purposes and without any implied limitations, each of packets 3900 and 3902 is shown as having three VLAN Tag fields (indicating the use of VLAN stacking), labeled 3910, 3920, and 3930, respectively. An expanded view of an example structure of the VLAN Tag field 3910 is also shown in FIG. 39. Each of VLAN Tag fields 3920 and 3930 may have a similar structure.

As illustrated in FIG. 39, TDO 3700 is preferably inserted after the tags in the corresponding Ethernet header. If any other Ethernet-layer-specific headers were present after the Ethernet header, then those headers would have been prepended to TDO 3700. For example, in FIG. 39, the VLAN stack 3910/3920/3930 is positioned before TDO 3700 and represents the context on which the topology information is being exchanged. Since the TPID field 3702 of TDO 3700 (also see FIG. 37) takes the position of an EtherType field, a processing bridge can deduce from the value encoded therein that the next header is a TDO. When a TDO 3700 is present, the processing bridge will also look at the EtherType field 3840 located after the TDO to determine whether or not other Ethernet-specific headers are present.

According to an example embodiment disclosed above, e.g., in the summary section and/or in reference to any one or any combination of some or all of FIGS. 1-39, provided is an apparatus, comprising a network device (e.g., 900, FIG. 9) that comprises: at least one processor (e.g., 12, FIG. 9); and at least one memory (e.g., 14, FIG. 9) including program code; and wherein the at least one memory and the program code are configured to, with the at least one processor, cause the network device at least to: encode (e.g., at 1004, 1006, FIG. 10) a data-plane header (e.g., 810, FIG. 8) of a first data packet, the data-plane header including a topology-discovery header (e.g., 820, FIG. 8) having information for automated discovery of topology of a network; and send (e.g., at 1010, FIG. 10) the first data packet through one or more links of the network in accordance with the data-plane header.

In some embodiments of the above apparatus, the at least one memory and the program code are configured to, with the at least one processor, cause the information to include one or more of: an identifier of a neighbor (e.g., 1322, FIG. 13) connected to the network device over a corresponding one of the one or more links; a link state advertisement (LSA) (e.g., 1414, FIG. 14); an LSA acknowledgement (e.g., 1210, FIG. 19); and an LSA request (e.g., 1210, FIG. 20).

In some embodiments of any of the above apparatus, the at least one memory and the program code are configured to, with the at least one processor, cause the data-plane header to include a source address (e.g., 612, FIG. 8) and a destination address (e.g., 614, FIG. 8) of the first data packet.

In some embodiments of any of the above apparatus, the at least one memory and the program code are configured to, with the at least one processor, cause the first data packet to have no payload.

In some embodiments of any of the above apparatus, the at least one memory and the program code are configured to, with the at least one processor, cause the data-plane header to be an Internet Protocol packet header (e.g., 3300, FIG. 33) or an Ethernet packet header (e.g., header of 3902, FIG. 39).

In some embodiments of any of the above apparatus, the at least one memory and the program code are configured to, with the at least one processor, cause the topology-discovery header to be an extension header of the data-plane header.

In some embodiments of any of the above apparatus, the at least one memory and the program code are configured to, with the at least one processor, cause the network device to send the first data packet (e.g., at 2222, FIG. 22) in response to a second data packet received from the network (e.g., at 1102, FIG. 11), the second data packet having a respective data-plane header (e.g., 810, FIG. 8) that includes a respective topology-discovery header (e.g., 820, FIG. 8) having respective information for automated discovery of the topology of the network.

In some embodiments of any of the above apparatus, the at least one memory and the program code are configured to, with the at least one processor, cause the network device to load (e.g., at 1110, FIG. 11) information obtained or derived from the respective topology-discovery header of the second data packet into at least one of: a routing information base (e.g., 38, FIG. 9) of the network device; a topology database (e.g., 40, FIG. 9) of the network device; and a forwarding information base (e.g., 50, FIG. 9) of the network device.

In some embodiments of any of the above apparatus, the at least one memory and the program code are configured to, with the at least one processor, cause the topology-discovery header of the first data packet to have a plurality of link state advertisements corresponding to contents of a link state database of the network device (e.g., 2222, FIG. 22).

In some embodiments of any of the above apparatus, the at least one memory and the program code are configured to, with the at least one processor, cause the topology-discovery header of the first data packet to have a link state advertisement obtained from the respective topology-discovery header of the second data packet (e.g., 2714, 2716, FIG. 27).

In some embodiments of any of the above apparatus, the at least one memory and the program code are configured to, with the at least one processor, cause the topology-discovery header of the first data packet to have a link state advertisement obtained from a link state database of the network device (e.g., 3212, 3214, FIG. 32).

In some embodiments of any of the above apparatus, the at least one memory and the program code are configured to, with the at least one processor, cause the network device to broadcast or multicast the first data packet (e.g., 2108, FIG. 21).

In some embodiments of any of the above apparatus, the at least one memory and the program code are configured to, with the at least one processor, cause the topology-discovery header to have a plurality of link state advertisements (e.g., 2608, 2610, FIG. 26).

In some embodiments of any of the above apparatus, the at least one memory and the program code are configured to, with the at least one processor, cause the topology-discovery header to have a plurality of link-state-advertisement acknowledgements (e.g., 2808, 2810, FIG. 28).

In some embodiments of any of the above apparatus, the at least one memory and the program code are configured to, with the at least one processor, cause: the information to include a link state advertisement (LSA) (e.g., 1414, FIG. 14); and the network device to: start an LSA acknowledgement timer upon sending the first data packet; and send, after the LSA acknowledgement timer runs out (e.g., 3002, FIG. 30), a second data packet having a respective topology-discovery header in a data-plane header thereof, the respective topology-discovery header including a copy of the LSA (e.g., 3004, FIG. 30).

In some embodiments of any of the above apparatus, the at least one memory and the program code are configured to, with the at least one processor, cause the topology-discovery header to have a plurality of link-state-advertisement requests (e.g., 3108, 3110, FIG. 31).

According to another example embodiment disclosed above, e.g., in the summary section and/or in reference to any one or any combination of some or all of FIGS. 1-39, provided is an apparatus, comprising a network device (e.g., 900, FIG. 9) that comprises: at least one processor (e.g., 12, FIG. 9); and at least one memory (e.g., 14, FIG. 9) including program code; and wherein the at least one memory and the program code are configured to, with the at least one processor, cause the network device at least to: read (e.g., at 1104-1108, FIG. 11) a data-plane header (e.g., 810, FIG. 8) of a first data packet received from a network, the data-plane header including a topology-discovery header (e.g., 820, FIG. 8) having information for automated discovery of topology of the network; and use (e.g., at 1110, FIG. 11) the information to build or update at least one of: a routing information base (e.g., 38, FIG. 9) of the network device; a topology database (e.g., 40, FIG. 9) of the network device; and a forwarding information base (e.g., 50, FIG. 9) of the network device.

In some embodiments of the above apparatus, the information includes one or more of: an identifier of a neighbor (e.g., 1322, FIG. 13) connected to the network device over one or more links of the network; a link state advertisement (LSA) (e.g., 1414, FIG. 14); an LSA acknowledgement (e.g., 1210, FIG. 19); and an LSA request (e.g., 1210, FIG. 20).

In some embodiments of any of the above apparatus, the data-plane header includes a source address (e.g., 612, FIG. 8) and a destination address (e.g., 614, FIG. 8) of the data packet.

In some embodiments of any of the above apparatus, the first data packet has no payload.

In some embodiments of any of the above apparatus, the data-plane header is an Internet Protocol packet header (e.g., 3300, FIG. 33) or an Ethernet packet header (e.g., header of 3902, FIG. 39).

In some embodiments of any of the above apparatus, the topology-discovery header is an extension header of the data-plane header.

In some embodiments of any of the above apparatus, the at least one memory and the program code are configured to, with the at least one processor, cause the network device to send a second data packet (e.g., at 2222, FIG. 22) in response to the first data packet, the second data packet having a respective data-plane header (e.g., 810, FIG. 8) that includes a respective topology-discovery header (e.g., 820, FIG. 8) having respective information for automated discovery of the topology of the network.

According to yet another example embodiment disclosed above, e.g., in the summary section and/or in reference to any one or any combination of some or all of FIGS. 1-39, provided is a non-transitory machine-readable medium, having encoded thereon program code, wherein, when the program code is executed by a machine, the machine implements a method comprising the steps of: encoding (e.g., 1004, 1006, FIG. 10) a data-plane header (e.g., 810, FIG. 8) of a data packet, the data-plane header including a topology-discovery header (e.g., 820, FIG. 8) having information for automated discovery of topology of a network; and sending (e.g., 1010, FIG. 10) the data packet through one or more links of the network in accordance with the data-plane header.

According to yet another example embodiment disclosed above, e.g., in the summary section and/or in reference to any one or any combination of some or all of FIGS. 1-39, provided is a non-transitory machine-readable medium, having encoded thereon program code, wherein, when the program code is executed by a machine, the machine implements a method comprising the steps of: reading (e.g., 1104-1108, FIG. 11) a data-plane header (e.g., 810, FIG. 8) of a data packet received from a network, the data-plane header including a topology-discovery header (e.g., 820, FIG. 8) having information for automated discovery of topology of the network; and using (e.g., at 1110, FIG. 11) the information to build or update at least one of: a routing information base (e.g., 38, FIG. 9) of a network device; a topology database (e.g., 40, FIG. 9) of the network device; and a forwarding information base (e.g., 50, FIG. 9) of the network device.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media, such as magnetic disks or tapes, hard drives, or optically readable digital data storage media. The embodiments are also intended to cover computers programmed to perform said steps of methods described herein.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

The invention claimed is:

1. An apparatus, comprising an Internet Protocol (IP) network device for an IP network of IP network devices, the IP network device comprising:
   at least one processor; and
   at least one memory including program code; and
   wherein the at least one memory and the program code are configured to, with the at least one processor, cause the IP network device at least to:
      encode an IP data-plane header of a first IP data packet, the IP data-plane header including a topology-discovery header having in-band information for automated discovery of topology of the IP network, wherein the IP data-plane header corresponds to a data plane located lower than a control plane in an IP network-layer stack of the IP network and the in-band information includes one or more of:
         an identifier of an IP neighbor connected to the IP network device over a link of the IP network;
         a link state advertisement (LSA);
         an LSA acknowledgement; and
         an LSA request; and
      send the first IP data packet through the link of the IP network directly connected to the IP network device in accordance with the IP data-plane header to enable the IP neighbor to perform the automated discovery of the topology of the IP network.

2. The apparatus of claim 1, wherein the at least one memory and the program code are configured to, with the at least one processor, cause the IP data-plane header to include a source address and a destination address of the first IP data packet.

3. The apparatus of claim 1, wherein the at least one memory and the program code are configured to, with the at least one processor, cause the first IP data packet to have no payload.

4. The apparatus of claim 1, wherein the at least one memory and the program code are configured to, with the at least one processor, cause the topology-discovery header to be an extension header of the IP data-plane header.

5. The apparatus of claim 1, wherein the at least one memory and the program code are configured to, with the at least one processor, cause the IP network device to send the first IP data packet in response to a second IP data packet received from the IP network, the second IP data packet having a respective IP data-plane header that includes a respective topology-discovery header having respective information for automated discovery of the topology of the IP network.

6. The apparatus of claim 5, wherein the at least one memory and the program code are configured to, with the at least one processor, cause the IP network device to load information obtained or derived from the respective topology-discovery header of the second IP data packet into at least one of:
   a routing information base of the IP network device;
   a topology database of the IP network device; and
   a forwarding information base of the IP network device.

7. The apparatus of claim 5, wherein the at least one memory and the program code are configured to, with the at least one processor, cause the topology-discovery header of the first IP data packet to have a plurality of link state advertisements corresponding to contents of a link state database of the IP network device.

8. The apparatus of claim 5, wherein the at least one memory and the program code are configured to, with the at least one processor, cause the topology-discovery header of the first IP data packet to have a link state advertisement obtained from the respective topology-discovery header of the second IP data packet.

9. The apparatus of claim 5, wherein the at least one memory and the program code are configured to, with the at least one processor, cause the topology-discovery header of the first IP data packet to have a link state advertisement obtained from a link state database of the IP network device.

10. The apparatus of claim 1, wherein the at least one memory and the program code are configured to, with the at least one processor, cause the IP network device to broadcast or multicast the first IP data packet.

11. The apparatus of claim 1, wherein the at least one memory and the program code are configured to, with the at least one processor, cause the topology-discovery header to have a plurality of link state advertisements.

12. The apparatus of claim 1, wherein the at least one memory and the program code are configured to, with the at least one processor, cause the topology-discovery header to have a plurality of link-state-advertisement acknowledgements.

13. The apparatus of claim 1, wherein the at least one memory and the program code are configured to, with the at least one processor, cause:
   the information to include a link state advertisement (LSA); and
   the IP network device to:
      start an LSA acknowledgement timer upon sending the first IP data packet; and
      send, after the LSA acknowledgement timer runs out, a second IP data packet having a respective topology-discovery header in an IP data-plane header thereof, the respective topology-discovery header including a copy of the LSA.

14. The apparatus of claim 1, wherein the at least one memory and the program code are configured to, with the at least one processor, cause the topology-discovery header to have a plurality of link-state-advertisement requests.

15. An apparatus, comprising an Internet Protocol (IP) network device for an IP network of IP network devices, the IP network device comprising:
  at least one processor; and
  at least one memory including program code; and
  wherein the at least one memory and the program code are configured to, with the at least one processor, cause the IP network device at least to:
    read an IP data-plane header of a first IP data packet received from the IP network, the IP data-plane header including a topology-discovery header having in-band information for automated discovery of topology of the IP network, wherein the IP data-plane header corresponds to a data plane located lower than a control plane in an IP network-layer stack of the IP network and the in-band information includes one or more of:
      an identifier of an IP neighbor connected to the IP network device over a link of the IP network;
      a link state advertisement (LSA);
      an LSA acknowledgement; and
      an LSA request; and
    use the information to build or update at least one of:
      a routing information base of the IP network device;
      a topology database of the IP network device; and
      a forwarding information base of the IP network device.

16. The apparatus of claim 15, wherein the IP data-plane header includes a source address and a destination address of the IP data packet.

17. The apparatus of claim 15, wherein the first IP data packet has no payload.

18. The apparatus of claim 15, wherein the topology-discovery header is an extension header of the IP data-plane header.

19. The apparatus of claim 15, wherein the at least one memory and the program code are configured to, with the at least one processor, cause the IP network device to send a second IP data packet in response to the first IP data packet, the second IP data packet having a respective IP data-plane header that includes a respective topology-discovery header having respective information for automated discovery of the topology of the IP network.

20. A non-transitory machine-readable medium, having encoded thereon program code, wherein, when the program code is executed by a machine comprising an Internet Protocol (IP) network device in an IP network of IP network devices, the machine implements a method comprising:
  encoding an IP data-plane header of an IP data packet, the IP data-plane header including a topology-discovery header having in-band information for automated discovery of topology of the IP network, wherein the IP data-plane header corresponds to a data plane located lower than a control plane in an IP network-layer stack of the IP network and the in-band information includes one or more of:
    an identifier of an IP neighbor connected to the IP network device over a link of the IP network;
    a link state advertisement (LSA);
    an LSA acknowledgement; and
    an LSA request; and
  sending the IP data packet through the link of the IP network directly connected to the IP network device in accordance with the IP data-plane header to enable the IP neighbor to perform the automated discovery of the topology of the IP network.

21. A non-transitory machine-readable medium, having encoded thereon program code, wherein, when the program code is executed by a machine comprising an Internet Protocol (IP) network device in an IP network of IP network devices, the machine implements a method comprising:
  reading an IP data-plane header of an IP data packet received from the IP network, the IP data-plane header including a topology-discovery header having in-band information for automated discovery of topology of the IP network, wherein the IP data-plane header corresponds to a data plane located lower than a control plane in an IP network-layer stack of the IP network and the in-band information includes one or more of:
    an identifier of an IP neighbor connected to the IP network device over a link of the IP network;
    a link state advertisement (LSA);
    an LSA acknowledgement; and
    an LSA request; and
  using the information to build or update at least one of:
    a routing information base of an IP network device;
    a topology database of the IP network device; and
    a forwarding information base of the IP network device.

22. The apparatus of claim 1, wherein in-band information for the automated discovery of the topology of the IP network comprises one or more of:
  cost of the link;
  state of the link;
  number of seconds between a source node's IP data packets having topology-discovery headers;
  priority of a sender node;
  identity of a backup designated node;
  identity of one or more IP neighbor nodes from which one or more valid IP data packets having topology-discovery headers have been received in the IP network;
  time elapsed since the LSA was originated;
  type of the LSA;
  sequence number of the LSA;
  maximum bandwidth of the link;
  maximum reservable bandwidth on the link;
  unreserved bandwidth on the link;
  administrative group for the link; and
  cost of the IP network.

23. The apparatus of claim 1, wherein in-band information for the automated discovery of the topology of the IP network comprises:
  identification of the link;
  cost of the link;
  state of the link;
  identity of the IP neighbor node on the link; and
  identity of one or more IP neighbor nodes from which one or more valid IP data packets having topology-discovery headers have been received in the IP network.

24. The apparatus of claim 15, wherein in-band information for the automated discovery of the topology of the IP network comprises one or more of:
  cost of the link;
  state of the link;
  number of seconds between a source node's IP data packets having topology-discovery headers;
  priority of a sender node;
  identity of a backup designated node;
  identity of one or more IP neighbor nodes from which one or more valid IP data packets having topology-discovery headers have been received in the IP network;

time elapsed since the LSA was originated;
type of the LSA;
sequence number of the LSA;
maximum bandwidth of the link;
maximum reservable bandwidth on the link;
unreserved bandwidth on the link;
administrative group for the link; and
cost of the IP network.

25. The apparatus of claim 15, wherein in-band information for the automated discovery of the topology of the IP network comprises:
identification of the link;
cost of the link;
state of the link;
identity of the IP neighbor node on the link; and
identity of one or more IP neighbor nodes from which one or more valid IP data packets having topology-discovery headers have been received in the IP network.

26. The non-transitory machine-readable medium of claim 20, wherein in-band information for the automated discovery of the topology of the IP network comprises one or more of:
cost of the link;
state of the link;
number of seconds between a source node's IP data packets having topology-discovery headers;
priority of a sender node;
identity of a backup designated node;
identity of one or more IP neighbor nodes from which one or more valid IP data packets having topology-discovery headers have been received in the IP network;
time elapsed since the LSA was originated;
type of the LSA;
sequence number of the LSA;
maximum bandwidth of the link;
maximum reservable bandwidth on the link;
unreserved bandwidth on the link;
administrative group for the link; and
cost of the IP network.

27. The non-transitory machine-readable medium of claim 20, wherein in-band information for the automated discovery of the topology of the IP network comprises:
identification of the link;
cost of the link;
state of the link;
identity of the IP neighbor node on the link; and
identity of one or more IP neighbor nodes from which one or more valid IP data packets having topology-discovery headers have been received in the IP network.

28. The non-transitory machine-readable medium of claim 21, wherein in-band information for the automated discovery of the topology of the IP network comprises one or more of:
cost of the link;
state of the link;
number of seconds between a source node's IP data packets having topology-discovery headers;
priority of a sender node;
identity of a backup designated node;
identity of one or more IP neighbor nodes from which one or more valid IP data packets having topology-discovery headers have been received in the IP network;
time elapsed since the LSA was originated;
type of the LSA;
sequence number of the LSA;
maximum bandwidth of the link;
maximum reservable bandwidth on the link;
unreserved bandwidth on the link;
administrative group for the link; and
cost of the IP network.

29. The non-transitory machine-readable medium of claim 21, wherein in-band information for the automated discovery of the topology of the IP network comprises:
identification of the link;
cost of the link;
state of the link;
identity of the IP neighbor node on the link; and
identity of one or more IP neighbor nodes from which one or more valid IP data packets having topology-discovery headers have been received in the IP network.

* * * * *